(12) United States Patent
Sasaki

(10) Patent No.: US 9,243,884 B2
(45) Date of Patent: Jan. 26, 2016

(54) INDUCTIVE DETECTION TYPE ROTARY ENCODER

(71) Applicant: MITUTOYO CORPORATION, Kawasaki-shi, Kanagawa (JP)

(72) Inventor: Kouji Sasaki, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 66 days.

(21) Appl. No.: 14/157,852

(22) Filed: Jan. 17, 2014

(65) Prior Publication Data

US 2014/0203800 A1     Jul. 24, 2014

(30) Foreign Application Priority Data

Jan. 18, 2013    (JP) ................................ 2013-007916

(51) Int. Cl.
     *G01B 7/30*      (2006.01)
     *G01R 27/28*     (2006.01)
     *G01D 5/20*      (2006.01)

(52) U.S. Cl.
CPC ................ *G01B 7/30* (2013.01); *G01D 5/2046* (2013.01)

(58) Field of Classification Search
CPC ........... G01D 5/145; G01D 5/12; G01D 5/20; G01D 5/00; G01D 5/2046; G01D 11/245; G01D 5/16; G01D 5/204; G01D 5/14; G01D 5/147; G01D 5/2053; G01D 5/244; G01D 5/245; G01D 5/2452; G01D 18/00; G01D 18/008

USPC ............ 324/207.11–207.19, 207.23–207.25; 702/145, 146, 147, 148, 151
See application file for complete search history.

(56) References Cited

U.S. PATENT DOCUMENTS

| 2007/0018658 A1* | 1/2007 | Hayashida | G01B 3/18 324/650 |
| 2010/0102803 A1* | 4/2010 | Kobayashi | G01D 5/2013 324/207.25 |
| 2011/0227562 A1* | 9/2011 | Sasaki | G01D 5/2452 324/207.25 |

FOREIGN PATENT DOCUMENTS

JP      2011-085504      4/2011

* cited by examiner

*Primary Examiner* — Patrick Assouad
*Assistant Examiner* — Taqi Nasir
(74) *Attorney, Agent, or Firm* — Rankin, Hill & Clark LLP

(57) ABSTRACT

An inductive detection type rotary encoder comprises: a stator; and a rotor that is engaged with a rotation shaft to rotate along with the rotation shaft and faces the stator in an axial direction. The stator comprises at least two transmission windings and reception windings that are disposed from an inner peripheral side to an outer peripheral side, and the rotor comprises at least two magnetic flux coupling bodies that are respectively magnetic flux coupled with these at least two transmission windings and reception windings to configure angle detection tracks. Furthermore, inner peripheral side reception windings and outer peripheral side reception windings are connected in series, and are led out by lead-out wirings commonly used in the inner peripheral side reception windings and the outer peripheral side reception windings.

9 Claims, 24 Drawing Sheets

Measurement by First Angle Detection Track

Measurement by Second Angle Detection Track

INDUCTIVE DETECTION TYPE ROTARY ENCODER

CROSS-REFERENCE TO RELATED APPLICATIONS

This application is based upon and claims the benefit of priority from the prior Japanese Patent Application No. 2013-7916, filed on Jan. 18, 2013, the entire contents of which are incorporated herein by reference.

BACKGROUND OF THE INVENTION

1. Field of the Invention

The present invention relates to a rotary encoder that detects a change in a physical quantity accompanying rotation of a rotor with respect to a stator and measures a rotation angle of an object based on that change.

2. Description of the Related Art

An inductive detection type rotary encoder comprises: a stator having disposed therein a transmission winding and a reception winding; and a rotor having disposed therein a magnetic flux coupling winding that is magnetic flux coupled with the transmission winding and reception winding (for example, JP 2011-085504 A). In the rotary encoder, it is required that a pitch of the reception winding be further refined, due to a request for miniaturization of a micrometer, or the like, in which the rotary encoder is mounted, and due to a request for increased accuracy.

When configuring a rotary encoder of absolute position detection type, at least two reception windings are required. The reception winding includes a plurality of wirings that detect signals of different phases. Therefore, when the number of reception windings increases, a wiring pattern becomes proportionately more complex and, furthermore, a circuit scale ends up increasing.

SUMMARY OF THE INVENTION

An inductive detection type rotary encoder according to an embodiment of the present invention comprises: a stator; a rotor that is engaged with a rotation shaft to rotate along with the rotation shaft and faces the stator in an axial direction; and at least two angle detection tracks that are formed coaxially to the rotation shaft on a surface of the stator facing the rotor and a surface of the rotor facing the stator and are disposed from an inner peripheral side to an outer peripheral side. The at least two angle detection tracks each comprise: a transmission winding that is provided to the stator and is formed annularly around the rotation shaft; a reception winding that is provided to the stator and is formed annularly around the rotation shaft along the transmission winding; and a magnetic flux coupling body that is provided to the rotor and is formed annularly around the rotation shaft to be magnetic flux coupled with the transmission winding and the reception winding. Furthermore, one ends of one of the reception windings and another of the reception windings provided to the at least two angle detection tracks are commonly connected, and the other ends of the one of the reception windings and the another of the reception windings provided to the at least two angle detection tracks are each led out by a lead-out wiring.

In the inductive detection type rotary encoder having the above-described configuration, one of the reception windings and another of the reception windings are connected in series, and are led out by lead-out wirings commonly used in the one of the reception windings and the other of the reception windings. It is therefore possible to reduce the number of lead-out wirings from the reception windings to half and, furthermore, to reduce a circuit scale of a reception control unit.

The above-described inductive detection type rotary encoder may be configured as follows, for example. That is, the rotor comprises a first rotor that is engaged with the rotation shaft to rotate along with the rotation shaft and faces the stator in the axial direction, and a second rotor that is disposed on an outer peripheral side of the first rotor, is rotatable with respect to the first rotor, and faces the stator in the axial direction. Furthermore, the inductive detection type rotary encoder further comprises a rotation transmitting means that transmits rotation of the rotation shaft to rotate the second rotor at a different rotation speed from the first rotor. Moreover, the at least two angle detection tracks comprise an inner peripheral side angle detection track and an outer peripheral side angle detection track that is disposed on an outer peripheral side of the inner peripheral side angle detection track. The inner peripheral side angle detection track is formed coaxially to the rotation shaft on a surface of the stator facing the first rotor and a surface of the first rotor facing the stator, and the outer peripheral side angle detection track is formed coaxially to the rotation shaft on a surface of the stator facing the second rotor and a surface of the second rotor facing the stator. Furthermore, a magnetic flux coupling body configuring the inner peripheral side angle detection track is provided to the first rotor, and a magnetic flux coupling body configuring the outer peripheral side angle detection track is provided to the second rotor.

In addition, the above-described inductive detection type rotary encoder may be configured as follows. That is, the above-described rotor comprises a first rotor that is engaged with the rotation shaft to rotate along with the rotation shaft and faces the stator in the axial direction, and a second rotor that is disposed on an outer peripheral side of the first rotor, is rotatable with respect to the first rotor, and faces the stator in the axial direction. Furthermore, the inductive detection type rotary encoder further comprises a rotation transmitting means that transmits rotation of the rotation shaft to rotate the second rotor at a different rotation speed from the first rotor. Moreover, the above-described at least two angle detection tracks comprise a first angle detection track and a second angle detection track that are formed coaxially to the rotation shaft at, respectively, a portion of the stator facing the first rotor and a portion of the first rotor facing the stator, and a third angle detection track and a fourth angle detection track that are formed coaxially to the rotation shaft at, respectively, a portion of the stator facing the second rotor and a portion of the second rotor facing the stator. Furthermore, one ends of any two of the reception windings configuring the first through fourth angle detection tracks are commonly connected, and the other ends of the two of the reception windings configuring the first through fourth angle detection tracks are each led out by a lead-out wiring.

Furthermore, the above-described inductive detection type rotary encoder may be configured such that the first and second angle detection tracks are formed on a surface of the stator facing the first rotor and a surface of the first rotor facing the stator, the second angle detection track is disposed on an outer peripheral side of the first angle detection track, the third and fourth angle detection tracks are formed on a surface of the stator facing the second rotor and a surface of the second rotor facing the stator, and the fourth angle detection track is disposed on an outer peripheral side of the third angle detection track.

Moreover, the above-described inductive detection type rotary encoder may be configured such that the first and second angle detection tracks are formed stacked in a direction that the stator and the rotor face each other, and the third and fourth angle detection tracks are formed stacked in the direction that the stator and the rotor face each other.

In addition, it is also possible to configure the above-described inductive detection type rotary encoder such that the first and second angle detection tracks respectively generate N1 and N2 periodical changes of signal for one revolution of the first rotor, and the third and fourth angle detection tracks respectively generate N3 and N4 periodical changes of signal for one revolution of the second rotor. In this case, it is also conceivable to configure such that N1, N2, N3, and N4 are different numbers from each other, and greatest common factors of one and another of N1, N2 , N3 , and N4 are all 1. Configuring the above-described inductive detection type rotary encoder in this way makes it possible to reduce crosstalk in the first through fourth angle detection tracks and to achieve a further improvement in measurement accuracy.

Furthermore, it is also possible to configure the above-described inductive detection type rotary encoder such that two of the first through fourth angle detection tracks include a common transmission winding, the common transmission winding induces a current simultaneously in two reception windings in the first through fourth reception windings, and the two reception windings are commonly connected to, respectively, the remaining two reception windings in the first through fourth reception windings. Configuring in this way makes it possible to reduce the number of components by adopting a common configuration for the transmission winding in two of the angle detection tracks, and lower a manufacturing cost by simplifying a manufacturing process. Moreover, since it is possible for an angle of two detection tracks to be detected by one transmission winding, speeding up of angle detection and simplification of circuit configuration are expected.

DETAILED DESCRIPTION

Embodiments of an inductive detection type rotary encoder according to the present invention will be described below with reference to the drawings.

[1. First Embodiment]
[1-1. Overall Configuration]

Figure 1:
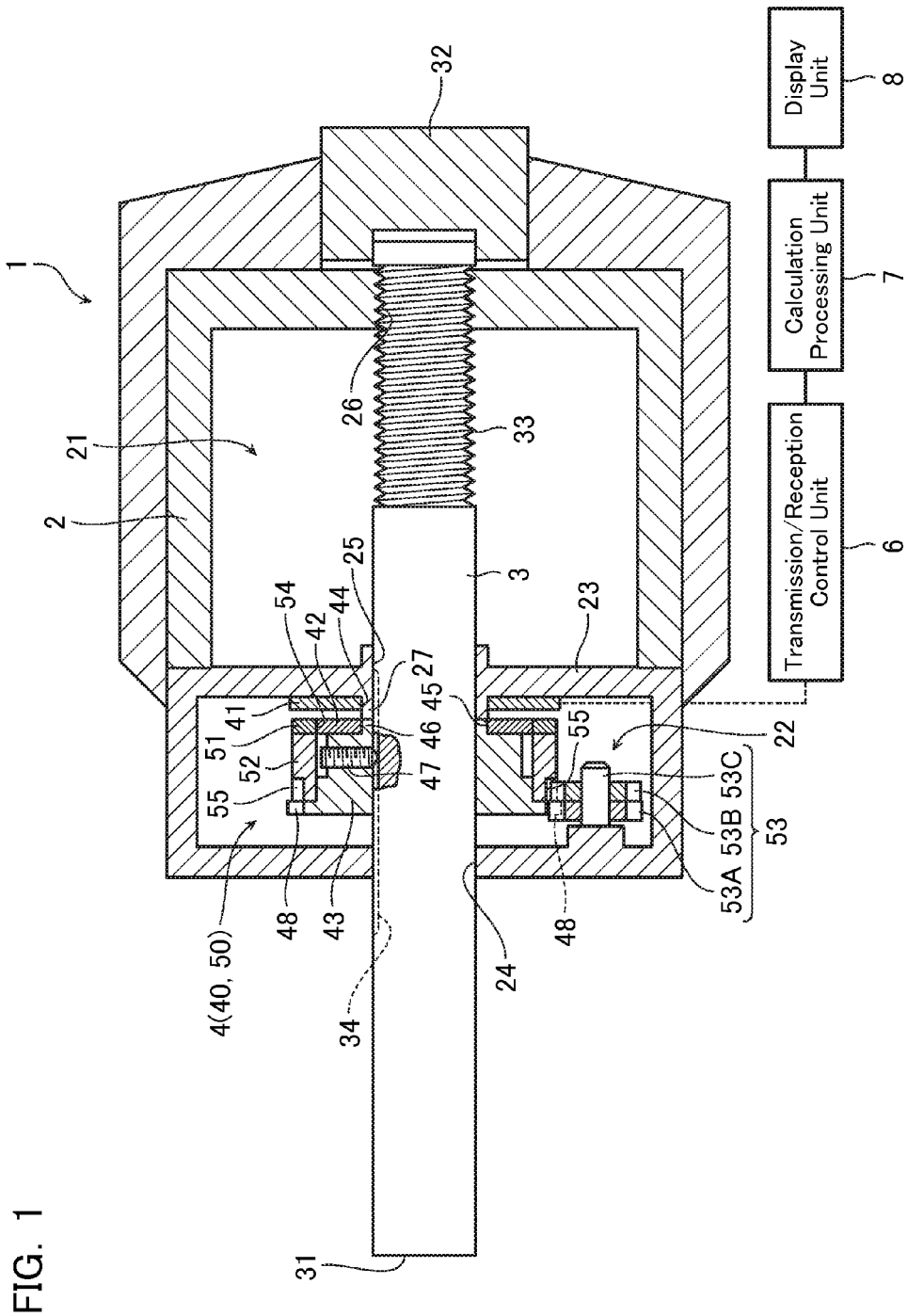
FIG. 1 is a cross-sectional view showing a micrometer head 1 according to a first embodiment.

First, an overall configuration of a micrometer head 1 having mounted therein an inductive detection type rotary encoder 4 according to a first embodiment will be described with reference to FIG. 1. FIG. 1 is a cross-sectional view showing the micrometer head 1 according to the first embodiment.

The micrometer head 1 includes a main body 2, a spindle 3 extending from the main body 2, and the inductive detection type rotary encoder 4 provided around the spindle 3. In addition, the micrometer head 1 includes a transmission/reception control unit 6, a calculation processing unit 7, and a display unit 8. The transmission/reception control unit 6 controls transmission/reception of signals to/from the inductive detection type rotary encoder 4. The calculation processing unit 7 executes calculation processing based on a signal from the transmission/reception control unit 6 (the inductive detection type rotary encoder 4). The display unit 8 displays calculation results calculated by the calculation processing unit 7.

The main body 2 is formed in a substantially cylindrical shape, and comprises housing spaces 21 and 22 therein. The housing spaces 21 and 22 are partitioned by a partitioning plate 23. Through holes 24 and 25 through which the spindle 3 penetrates are respectively formed in a wall on a spindle tip end side (left side in the figure) of the main body 2 and in the partitioning plate 23. A female screw 26 is formed at an end on the base end side (right side in the figure) of the main body 2. The through holes 24 and 25, and the female screw 26 are disposed coaxially.

The spindle 3 is formed in a substantially columnar shape, and includes a contact surface 31 with an object to be measured (not illustrated) at the tip end, and a knob part 32 at the base end. This knob part 32 is for performing rotational operation of the spindle 3 from outside. Moreover, the spindle 3 is inserted into the through holes 24 and 25 of the main body 2, and both ends of the spindle 3 are protruded from the main body 2. In addition, a feed screw 33 is formed on an outer periphery of the spindle 3 and is threaded with the female screw 26 of the main body 2. In this way, when the knob part 32 is rotated, the feed screw 33 and the female screw 26 are threaded with each other whereby the spindle 3 advances or retracts along the through holes 24 and 25. The feed screw 33 is formed for 40 revolutions at a pitch of 0.5 mm, for example, and can advance or retract the spindle 3 by 20 mm. Moreover, a linear key groove 34 is formed along an axial direction at a substantially central part of the spindle 3.

[1-2. Configuration of Inductive Detection Type Rotary Encoder 4]

Figure 2:
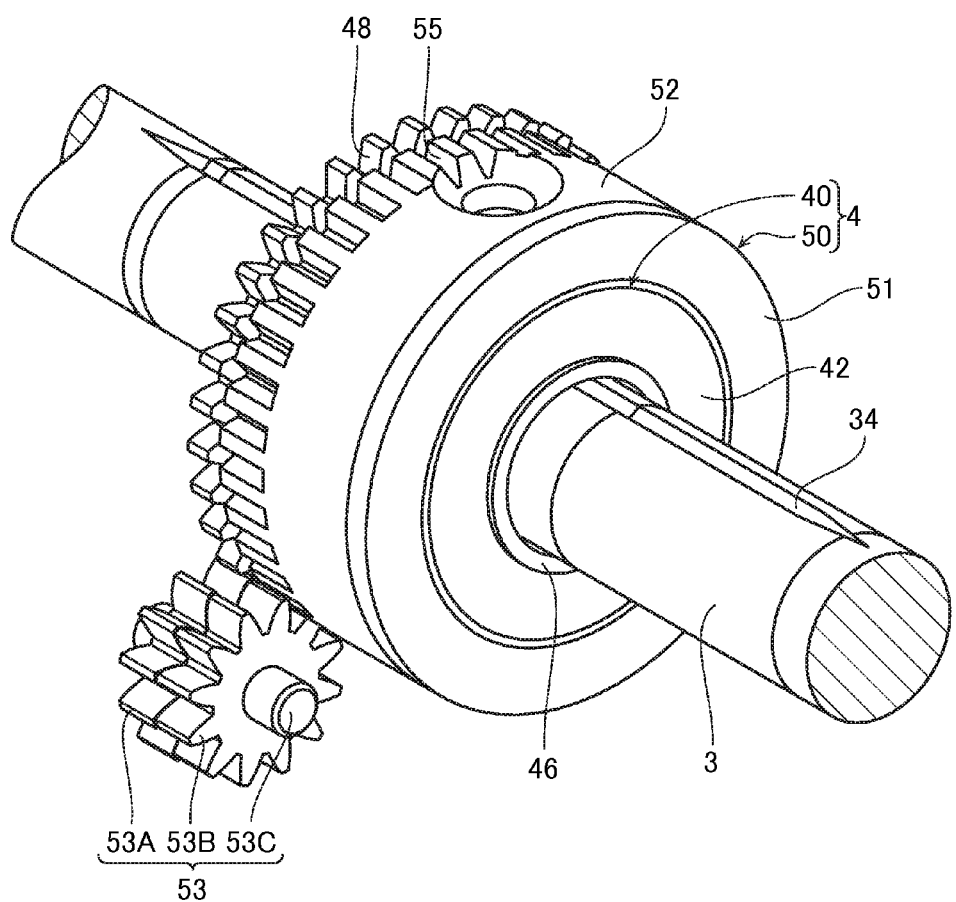
FIG. 2 is a perspective view of a first rotor 42 and a second rotor 51 configuring an inductive detection type rotary encoder 4 of same embodiment.
Figure 3:
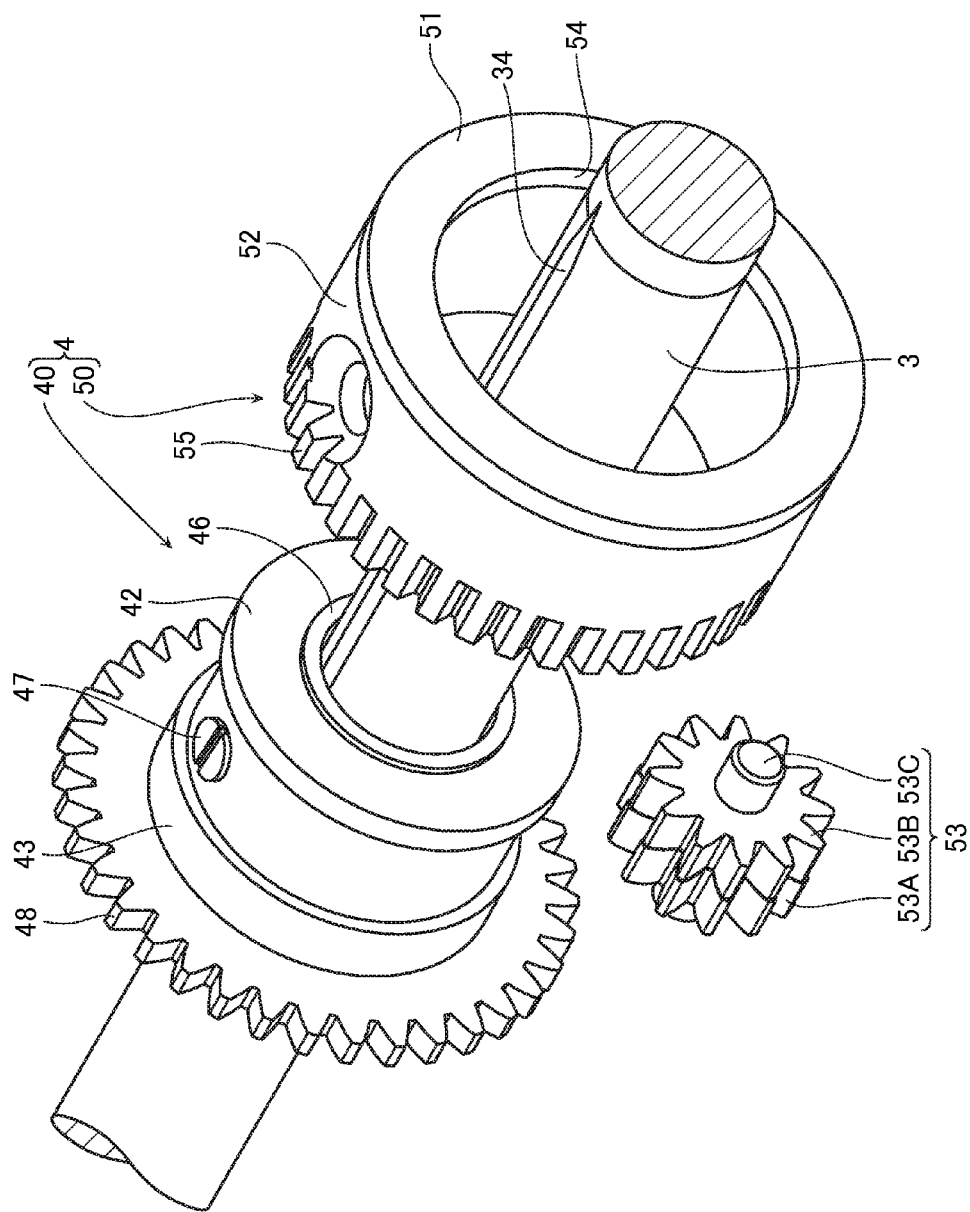
FIG. 3 is an exploded perspective view of the first rotor 42 and the second rotor 51 configuring same inductive detection type rotary encoder 4.

Next, a first rotor 42 and a second rotor 51 configuring the inductive detection type rotary encoder 4 will be described with reference to FIGS. 1 to 3. FIG. 2 is a perspective view of the first rotor 42 and the second rotor 51 configuring the inductive detection type rotary encoder 4. FIG. 3 is an exploded perspective view of the first rotor 42 and the second rotor 51 configuring the inductive detection type rotary encoder 4. The inductive detection type rotary encoder 4 is configured from a first rotary encoder 40 and a second rotary encoder 50 as shown in FIGS. 2 and 3, and is housed in the housing space 22 of the main body 2.

The first rotary encoder 40 comprises a stator 41, the first rotor 42, and a first rotation cylinder 43.

The stator 41 includes at a center of a circular plate thereof a through hole 44 through which the spindle 3 is inserted, and is fixed to the partitioning plate 23. Specifically, the stator 41 is externally fitted on a rim member 27 formed around the through hole 25 of the partitioning plate 23.

The first rotor 42 includes at a center of a circular plate thereof a through hole 45 through which the spindle 3 is inserted, and is disposed facing the stator 41 in the axial direction at a position separated from the stator 41 by a certain dimension.

In a state that the spindle 3 is inserted into the first rotation cylinder 43, the first rotation cylinder 43 is disposed closer to the tip end side of the spindle 3 than is the stator 41 and rotatably supports the first rotor 42 around a shaft of the spindle 3. That is, a rotor support part 46 is formed along an outer periphery of the spindle 3 at an end of the first rotation cylinder 43 on a stator 41 side, and the first rotor 42 is externally fitted on an outer periphery of this rotor support part 46.

In addition, the first rotation cylinder 43 comprises a screw key 47 threaded toward a center from an outer periphery. A tip end of this key 47 protrudes from an inner periphery of the first rotation cylinder 43 and is engaged with the key groove 34 on the outer periphery of the spindle 3. That is, when the spindle 3 rotates, the key 47 is engaged with the key groove 34 of the spindle 3, and thus the first rotation cylinder 43 rotates in synchronization with the spindle 3.

Moreover, a first gear 48 is formed on an outer periphery of the first rotation cylinder 43. This first gear 48 is provided at an end of the first rotation cylinder 43 on the tip end side of the spindle 3, and has a larger outer diameter dimension than an outer periphery of another part of the first rotation cylinder 43. The number of teeth of the first gear 48 is set at 40, for example.

The second rotary encoder 50 comprises the stator 41, the second rotor 51, a second rotation cylinder (holder) 52, and a relay gear 53.

The stator 41 is the stator 41 of the first rotary encoder 40, and is a component common to the first rotary encoder 40 and the second rotary encoder 50.

The second rotor 51 includes a hole 54 capable of having the first rotor 42 disposed therein at the center of the circular plate, and is disposed on an outer periphery of the first rotor 42 to surround it. In addition, the second rotor 51 is disposed facing the stator 41 in the axial direction at a position separated from the stator 41 by a certain dimension. In this way, surfaces of each of the rotors 42 and 51 facing the stator 41 form a substantially identical plane.

The first rotation cylinder 43 (portion excluding the first gear 48) is inserted inside the second rotation cylinder 52 and the second rotation cylinder 52 is supported on the first rotation cylinder 43. The second rotor 51 is attached at an end of this second rotation cylinder 52 on a stator 41 side. In this way, the second rotor 51 is rotatably supported around the shaft of the spindle 3. That is, the first rotor 42 and the second rotor 51 are arranged inside and outside, respectively, thereby configuring a double cylindrical structure.

A second gear 55 is formed on an outer periphery of the second rotation cylinder 52. This second gear 55 is provided at an end of the second rotation cylinder 52 at the tip end side of the spindle 3, and has substantially the same outer diameter dimension as the gear 48 of the first rotation cylinder 43. The number of teeth of the second gear 55 is set at 41, for example, and is larger by one tooth than the first gear 48.

The relay gear 53 is rotatably supported on the main body 2, and is arranged to be meshed with both the first gear 48 and the second gear 55. That is, the relay gear 53 is configured to include a first relay gear 53A meshed with the first gear 48, a second relay gear 53B meshed with the second gear 55, and a shaft part 53C for axially supporting the relay gears 53A and 53B on the same shaft. The numbers of teeth of the relay gears 53A and 53B are each set at the same number such as 12, for example. Modules of a pair of the first gear 48 and the first relay gear 53A match with each other, and modules of the other pair of the second gear 55 and the second relay gear 53B match with each other so that the second rotation cylinder 52 can smoothly rotate via the relay gear 53 when the first rotation cylinder 43 rotates.

At this time, the rotors 42 and 51 rotate at different speeds due to a difference in the numbers of teeth of the gear 48 and the gear 55. For example, when the number of teeth of the gear 48 is 40 and the number of teeth of the gear 55 is 41 as in the present embodiment, the first rotor 42 rotates 40 times and the second rotor 51 rotates 39 times while the spindle 3 rotates 40 times within an advance/retract movement range.

Moreover, the first rotary encoder 40 and the second rotary encoder 50 can detect absolute angles of the rotors 42 and 51 during one revolution, respectively. That is, the stator 41 outputs a phase signal indicating a periodical change per revolution of the first rotor 42. Then, the first rotor 42 rotates in synchronization with the spindle 3, and thus the phase signal for the first rotor 42 indicates a change of the first cycle of the present invention due to one revolution of the spindle 3. For example, 40 periodical changes are indicated while the spindle 3 rotates 40 times.

The stator 41 outputs a phase signal indicating a periodical change per revolution also for the second rotor 51. Then, the second rotor 51 rotates 39 times while the spindle 3 rotates 40 times, and thus the phase signal for the second rotor 51 indicates 39 periodical changes due to 40 revolutions of the spindle 3.

[1-3. Stacked Structure of Inductive Detection Type Rotary Encoder 4]

Figure 4:
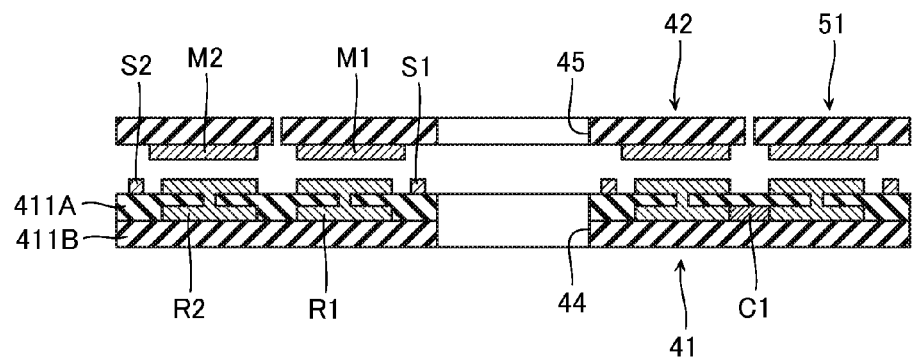
FIG. 4 is a cross-sectional side view showing a configuration of a stator 41 and the first and second rotors 42 and 51 of same inductive detection type rotary encoder 4.

Next, a stacked structure of the stator 41, the first rotor 42, and the second rotor 51 will be described with reference to FIG. 4. FIG. 4 is a cross-sectional view of the stator 41, the first rotor 42, and the second rotor 51. The stator 41 includes a first reception winding R1 and a second reception winding R2 formed straddling over insulating layers 411A and 411B.

Moreover, the stator 41 is configured comprising a first transmission winding S1 between the through hole 44 and the first reception winding R1, and a second transmission winding S2 on an outer periphery of the second reception winding R2. Furthermore, the first reception winding R1 and the second reception winding R2 are commonly connected by a first contact wiring C1. The first rotor 42 includes a first magnetic flux coupling body M1. Moreover, the second rotor 51 includes a second magnetic flux coupling body M2.

[1-4. Planar Structure of Inductive Detection Type Rotary Encoder 4]

Next, a planar configuration on the stator 41, the first rotor 42, and the second rotor 51 will be described in detail with reference to FIGS. 5 to 8. FIGS. 5 to 8 are plan views showing configurations of the stator 41, the first rotor 42, and the second rotor 51, respectively.

Figure 5:
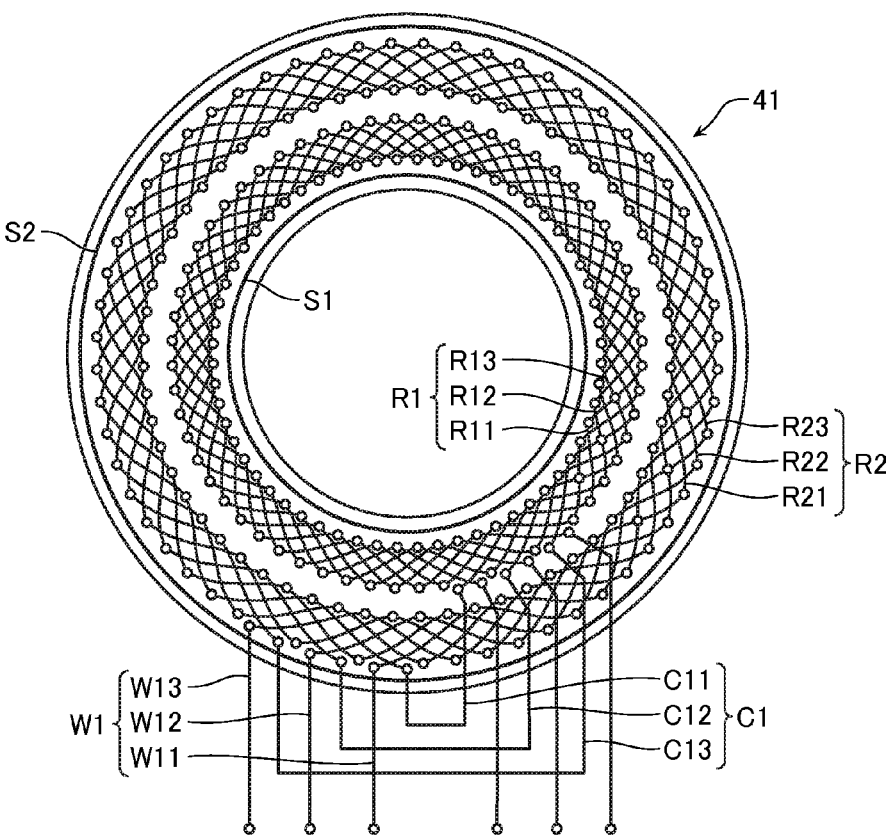
FIG. 5 is a plan view showing the configuration of the stator 41 of same inductive detection type rotary encoder 4.

As shown in FIG. 5, the first transmission winding S1 and the second transmission winding S2 are provided coaxially to the spindle 3 on the stator 41 facing the first and second rotors 42 and 51. The first transmission winding S1 is formed in a substantially circular shape having a first diameter from the spindle 3 (rotational axis). The second transmission winding S2 is formed in a substantially circular shape having a second diameter larger than the first diameter from the spindle 3 (rotational axis).

In addition, as shown in FIG. 5, the first reception winding R1 and the second reception winding R2 are provided coaxially to the spindle 3 on the stator 41 facing the first and second rotors 42 and 51. The first reception winding R1 and the second reception winding R2 are formed between the first transmission winding S1 and the second transmission winding S2, and the first reception winding R1 is formed on an inner peripheral side and the second reception winding R2 is formed on an outer peripheral side. The first reception winding R1 detects a magnetic flux generated by the first magnetic flux coupling body M1. The second reception winding R2 detects a magnetic flux generated by the second magnetic flux coupling body M2.

Figure 6:
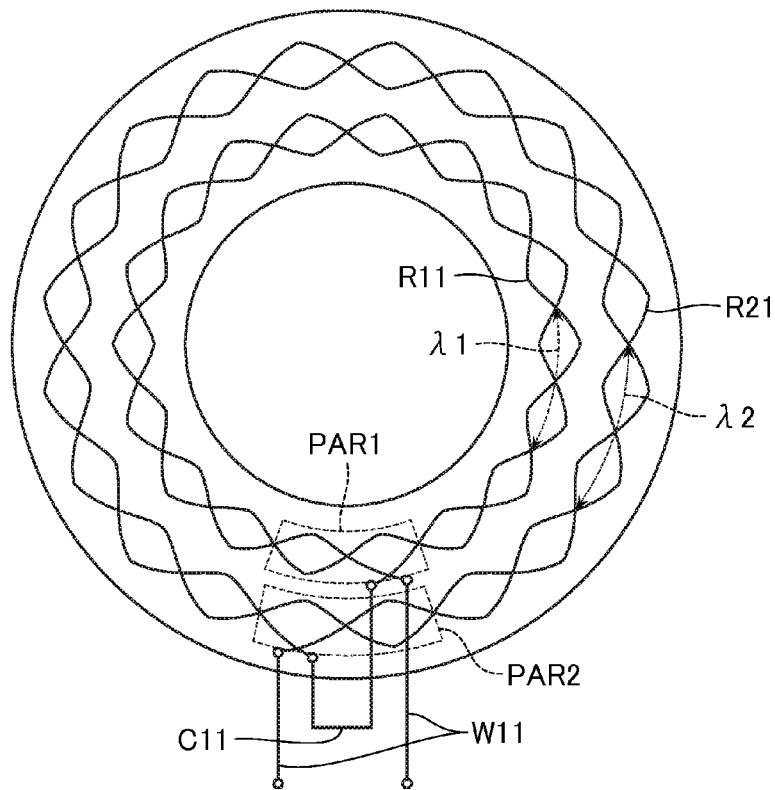
FIG. 6 is a plan view for explaining in detail the configuration of the stator 41 of same inductive detection type rotary encoder 4.

The first reception winding R1 and the second reception winding R2 are respectively configured from three reception windings R11 to R13 each having a different phase in a rotation direction and three reception windings R21 to R23 each having a different phase in a rotation direction. Focusing here on the reception winding R11, as shown in FIG. 6, the reception winding R11 is configured from an electric wire formed in a loop shape (rhombic shape). Crossing portions of the reception winding R11 are arranged above and below a substrate in order to prevent the crossing portions from short-circuiting, and are connected to each other by a via hole to be disposed insulated and isolated. Moreover, a group of two loops of the electric wire configuring this reception winding R11 configures a winding PAR1. In the present embodiment, the reception winding R11 is configured having nine (N1) windings PAR1 connected in series. Moreover, the reception winding R21 configuring the second reception winding R2 is configured having 10 (N2) windings PAR2 connected in series. Furthermore, these reception winding R11 and reception winding R21 are connected in series by a contact wiring C11 and led out by a common lead-out wiring W11. Therefore, one of the two wirings configuring the lead-out wiring W1 is connected to the reception winding R11 and the other of the two wirings configuring the lead-out wiring W1 is connected to the reception winding R21. Note that the other reception windings R12, R13, R22, and R23 are also configured in a substantially similar way. That is, the reception windings R12 and R13 are configured in a substantially similar way to the reception winding R11, and the reception windings R22 and R23 are configured in a substantially similar way to the reception winding R21, the reception windings R12 and R22 are connected in series by a contact wiring C12 and led out by a lead-out wiring W12, and the reception windings R13 and R23 are connected in series by a contact wiring C13 and led out by a lead-out wiring W13.

Due to the inductive detection type rotary encoder according to the present embodiment, the first reception winding R1 and the second reception winding R2 are connected in series, and, furthermore, a lead-out wiring of these reception windings R1 and R2 is shared. As a result, the number of lead-out wirings of the reception windings is decreased to a half, and, furthermore, a circuit scale of the reception control unit is reduced. Moreover, in the inductive detection type rotary encoder according to the present embodiment, a signal of a first angle detection track configured from the first transmission winding S1, the later-described first magnetic flux coupling body M1, and the first reception winding R1 and a signal of a second angle detection track configured from the second transmission winding S2, the later-described second magnetic flux coupling body M2, and the second reception winding R2 are received from the common lead-out wirings W11 to W13. Therefore, detection of an angle by the first angle detection track and detection of an angle by the second angle detection track are performed alternately by time division.

Figure 7:
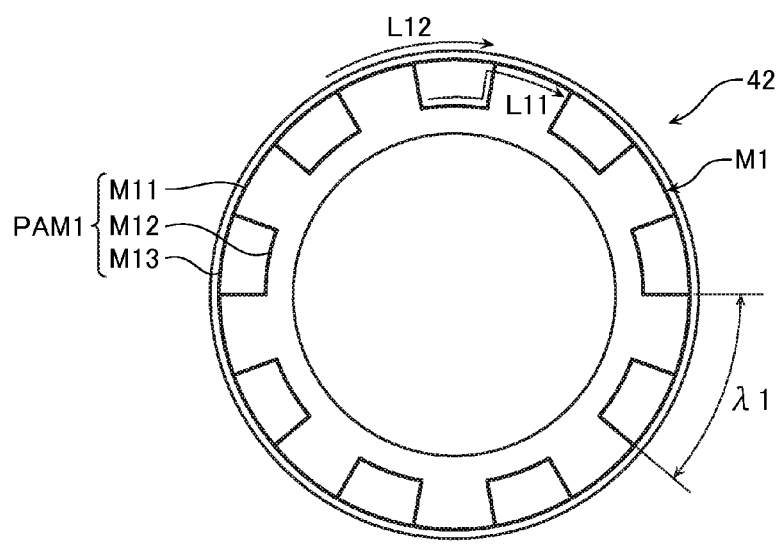
FIG. 7 is a plan view showing the configuration of the first rotor 42 of same inductive detection type rotary encoder 4.

As shown in FIG. 7, the first magnetic flux coupling body M1 is provided coaxially to the spindle 3 on the first rotor 42 facing the stator 41. The first magnetic flux coupling body M1 is formed such that a distance from the spindle 3 (rotational axis) changes periodically N1 times in one revolution of the first rotor 42. Moreover, the first magnetic flux coupling body M1 is configured to be capable of magnetic flux coupling with the first transmission winding S1.

The first magnetic flux coupling body M1 is formed having, for example, nine (N1) wiring patterns PAM1 circularly connected therein. The first magnetic flux coupling body M1 includes a wiring of a shape that has overlapped therein shapes of a portion including a continuous gear-shaped wiring that changes periodically in the rotation direction of the first rotor 42 with a pitch λ1, and a circular shaped wiring portion circumscribing this gear-shaped wiring portion. More specifically, the first magnetic flux coupling body M1 alternately configures a convex portion M11 protruding in a direction moving away from the spindle 3 and a concave portion M12 receding in a direction approaching the spindle 3. Moreover, the first magnetic flux coupling body M1 includes an annular joining portion M13 that joins a plurality of the convex portions M11. That is, a plurality of the concave portions M12 and the convex portions M11 form a gear-shaped first current path L11, and a plurality of the convex portions M11 and the joining portions M13 form an annular second current path L12.

Figure 8:
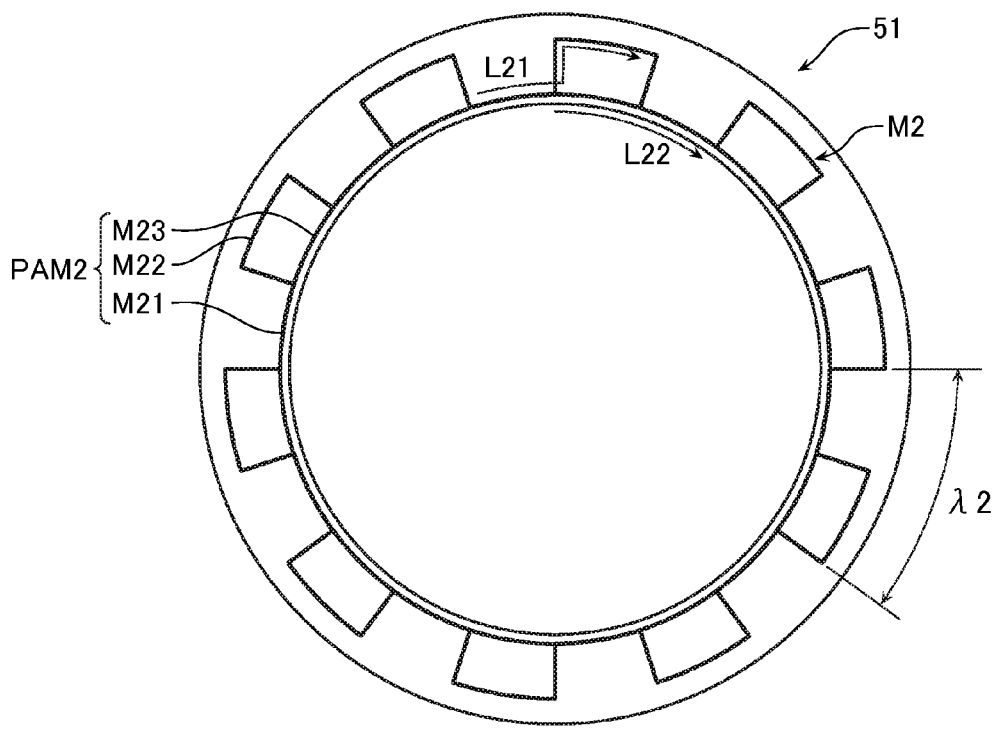
FIG. 8 is a plan view showing the configuration of the second rotor 51 of same inductive detection type rotary encoder 4.

As shown in FIG. 8, the second magnetic flux coupling body M2 is provided coaxially to the spindle 3 on the second rotor 51 facing the stator 41. The second magnetic flux coupling body M2 is formed such that a distance from the spindle 3 (rotational axis) changes periodically N2 times in one revolution of the second rotor 51. Moreover, the second magnetic flux coupling body M2 is configured to be capable of magnetic flux coupling with the second transmission winding S2.

The second magnetic flux coupling body M2 is formed having, for example, 10 (N2) wiring patterns PAM2 circularly connected therein. That is, the number of wiring patterns PAM2 of the second magnetic flux coupling body M2 differs by one from the number of wiring patterns PAM1 of the first magnetic flux coupling body M1. The second magnetic flux coupling body M2 includes a wiring of a shape that has overlapped therein shapes of a continuous gear-shaped wiring portion that changes periodically in the rotation direction of the first rotor 42 with a pitch λ2, and a circular shaped wiring portion inscribing this gear-shaped wiring portion. More specifically, the second magnetic flux coupling body M2 alternately configures a concave portion M21 receding in a direction approaching the spindle 3 and a convex portion M22 protruding in a direction moving away from the spindle 3. Moreover, the second magnetic flux coupling body M2 includes an annular joining portion M23 that joins a plurality of the concave portions M21. That is, a plurality of the concave portions M21 and the convex portions M22 form a gear-shaped first current path L21, and a plurality of the concave portions M21 and the joining portions M23 form an annular second current path L22.

[1-5. Transmission/Reception Control Unit 6 and Calculation Processing Unit 7]

Figure 9:
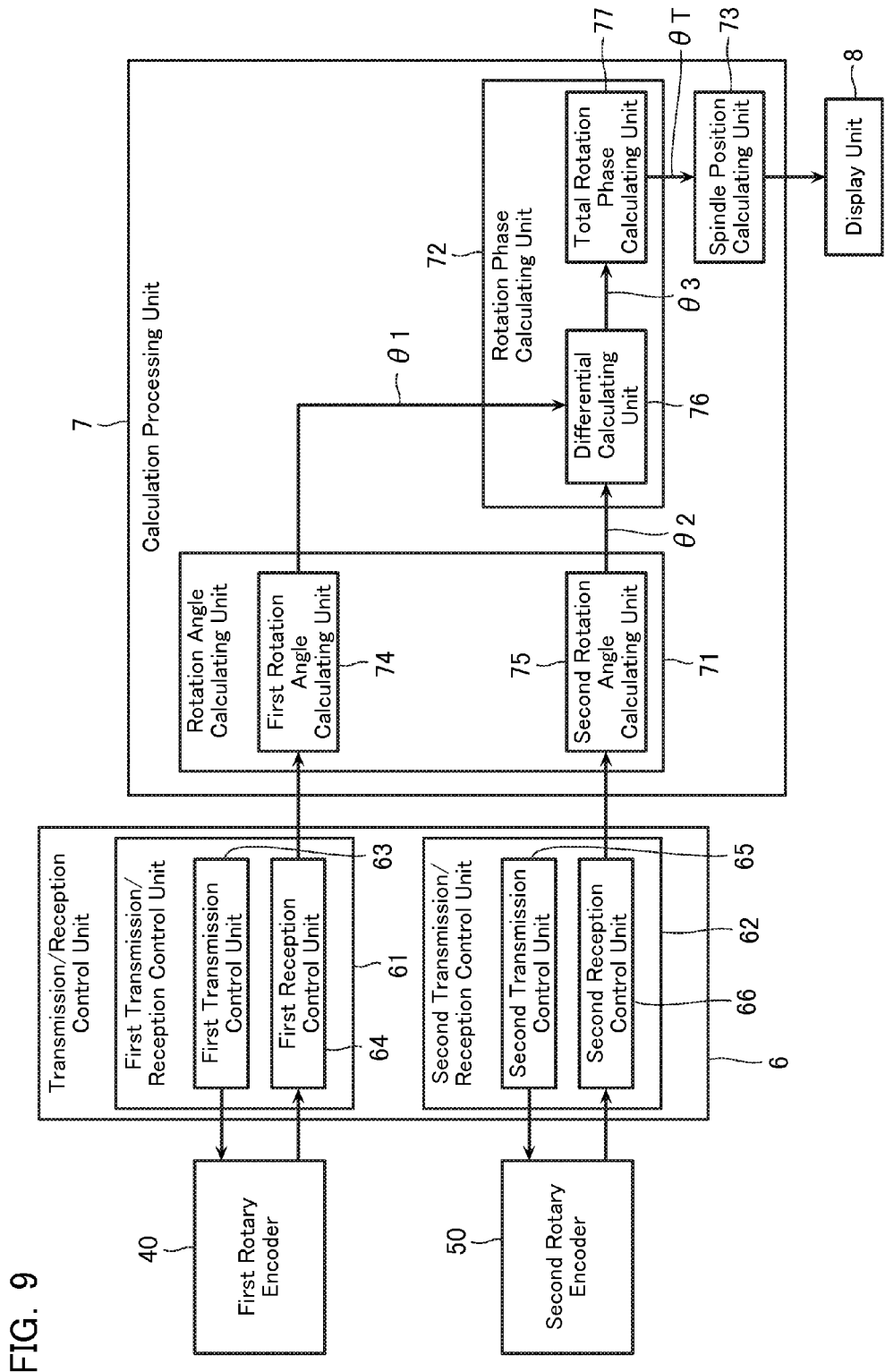
FIG. 9 is a block diagram showing a configuration of a transmission/reception control unit 6 and a calculation processing unit 7 of same embodiment.

Next, a configuration of the transmission/reception control unit 6 and the calculation processing unit 7 according to the present embodiment will be described in detail with reference to FIG. 9. FIG. 9 is a block diagram showing the configuration of the transmission/reception control unit 6 and the calculation processing unit 7.

First, the transmission/reception control unit 6 will be described. The transmission/reception control unit 6 comprises a first transmission/reception control unit 61 for controlling transmission/reception of signals to/from the first rotary encoder 40 and a second transmission/reception control unit 62 for controlling transmission/reception of signals to/from the second rotary encoder 50.

The first transmission/reception control unit 61 comprises a first transmission control unit 63 and a first reception control unit 64. The first transmission control unit 63 transmits a certain AC signal being for the first rotor 42 (for the first transmission winding S1) to the stator 41. The first reception control unit 64 receives a phase signal of the first rotor 42 from the stator 41 (from the first reception winding R1).

Similarly, the second transmission/reception control unit 62 comprises a second transmission control unit 65 and a second reception control unit 66. The second transmission control unit 65 transmits a certain AC signal being for the second rotor 51 (for the second transmission winding S2) to the stator 41. The second reception control unit 66 receives a phase signal of the second rotor 51 from the stator 41 (from the second reception winding R2). The first reception control unit 64 and the second reception control unit 66 output the phase signal of the first rotor 42 and the phase signal of the second rotor 51 received from the stator 41 to the calculation processing unit 7.

Next, the calculation processing unit 7 will be described. The calculation processing unit 7 comprises a rotation angle calculating unit 71, a rotation phase calculating unit 72, and a spindle position calculating unit 73. The rotation angle calculating unit 71 calculates rotation angles θ1 and θ2 of the first rotor 42 and the second rotor 51, respectively. The rotation phase calculating unit 72 calculates a rotation phase of the spindle 3 based on the rotation angles θ1 and θ2 of the rotors 42 and 51 calculated in the rotation angle calculating unit 71. The spindle position calculating unit 73 calculates an absolute position of the spindle 3 based on the rotation phase of the spindle 3 calculated in the rotation phase calculating unit 72.

The rotation angle calculating unit 71 comprises a first rotation angle calculating unit 74 and a second rotation angle calculating unit 75. The first rotation angle calculating unit 74 calculates the rotation angle θ1 of the first rotor 42 based on a phase signal from the first reception control unit 64. The second rotation angle calculating unit 75 calculates the rotation angle θ2 of the second rotor 51 based on a phase signal from the second reception control unit 66.

The first rotation angle calculating unit 74 calculates the rotation angle θ1 of the first rotor 42 as an absolute angle during one revolution (0°<θ1<360° based on the phase signal from the first reception control unit 64. Now, the phase signal from the first reception control unit 64 does not generate the same phase during one revolution of the first rotor 42. The first rotation angle calculating unit 74 stores therein a relationship between the rotation angle θ1 of the first rotor 42 and the phase signal in one-to-one correspondence. As a result, the rotation angle θ1 of the first rotor 42 is unambiguously defined depending on the phase signal outputted from the first reception control unit 64 and the absolute angle during one revolution of the first rotor 42 is calculated.

Moreover, the second rotation angle calculating unit 75 calculates the rotation angle θ2 of the second rotor 51 as an absolute angle during one revolution based on the phase signal from the second reception control unit 66, similarly to the first rotation angle calculating unit 74.

The rotation phase calculating unit 72 comprises a differential calculating unit 76 and a total rotation phase calculating unit 77. The differential calculating unit 76 calculates a differential θ3 between the rotation angle θ1 of the first rotor 42 and the rotation angle θ2 of the second rotor 51 calculated in the rotation angle calculating unit 71. The total rotation phase calculating unit 77 calculates a total rotation phase of the spindle 3 based on the differential θ3.

The total rotation phase calculating unit 77 stores therein a relationship between the differential θ3 and the total rotation phase of the spindle 3 in one-to-one correspondence. That is, a difference between the rotation angle θ1 of the first rotor 42 and the rotation angle θ2 of the second rotor 51 is set as one revolution while the spindle 3 rotates 40 times within the advance/retract movement range, hence the differential θ3 is calculated within a range of 0° to 360°, and a total rotation phase θT of the spindle 3 is unambiguously calculated depending on the differential θ3.

The spindle position calculating unit 73 is previously set and stores therein a movement pitch (0.5 mm) per revolution of the spindle 3. Then, the movement pitch (0.5 mm) is multiplied by the total rotation phase θT in the spindle position calculating unit 73 to thereby calculate a total movement amount of the spindle 3, that is, an absolute position of the spindle 3. The display unit 8 displays the absolute position of the spindle 3 by digital display, for example.

[1-6. Operation of Micrometer Head 1]

Next, operation of the micrometer head 1 according to the present embodiment will be described. When the spindle 3 is rotated by the knob part 32, the female screw 26 of the main body 2 is engaged with the feed screw 33 of the spindle 3 whereby the spindle 3 is advanced or retracted in an axial direction. When the spindle 3 rotates, the first rotation cylinder 43 rotates along with the spindle 3 by the key 47 engaged in the key groove 34 of the spindle 3.

When the first rotation cylinder 43 rotates, the first rotor 42 rotates along with the first rotation cylinder 43. The rotation of the first rotor 42 is detected by the stator 41 to be transmitted to the first reception control unit 64. Subsequently, the rotation angle θ1 within one revolution of the first rotor 42 is calculated in the calculation processing unit 7.

Now, since the first rotor 42 rotates in synchronization with the spindle 3, the rotation angle θ1 within one revolution of the first rotor 42 indicates a rotation angle within one revolution of the spindle 3.

In addition, when the first rotation cylinder 43 rotates, the first relay gear 53A of the relay gear 53 meshed with the gear 48 of the first rotation cylinder 43 rotates. Furthermore, the gear 55 of the second rotation cylinder 52 meshed with the second relay gear 53B of the relay gear 53 rotates and the second rotor 51 rotates along with the second rotation cylinder 52. A phase signal within one revolution of the second rotor 51 is detected by the stator 41 to be transmitted to the transmission/reception control unit 6. Subsequently, the rotation angle θ2 within one revolution of the second rotor 51 is calculated in the calculation processing unit 7.

Subsequently, the differential θ3 between the rotation angles θ1 and θ2 of the rotors 42 and 51 is calculated in the calculation processing unit 7, and the total rotation phase θT of the spindle 3 is calculated based on this differential θ3. Finally, an absolute position of the spindle 3 is calculated based on the total rotation phase θT and the feed pitch (0.5 mm) of the spindle 3, and is displayed on the display unit 8.

In the present embodiment, a rotation angle of the second rotary encoder 50 with respect to the first rotary encoder 40 can be employed up to one revolution. Therefore, the present embodiment allows a length measurement range of the spindle 3 to be increased. Moreover, if the configuration of the present embodiment is applied to a device having an equivalent length measurement range to that of the present embodiment, then component accuracy and allowable assembly accuracy required of configurative parts can be reduced.

[1-7. Operation of Rotary Encoder 4]

Next, an operating principle of the rotary encoder 4 according to the present embodiment will be described.

Figure 10:
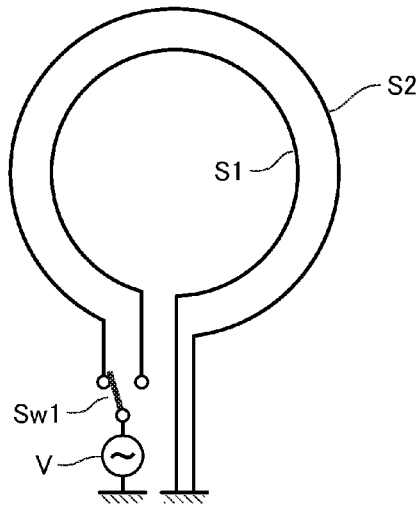
FIG. 10 is a circuit diagram showing a means for supplying a current to a first transmission winding S1 and a second transmission winding S2 according to same embodiment.

As shown in FIG. 10, the first transmission winding S1 and the second transmission winding S2 have their one ends both grounded, and their other ends connected to an AC power supply V via a switch Sw1. During measurement, a periodically changing transmission current is supplied alternately to the first transmission winding S1 and the second transmission winding S2. As a result, detection of an angle by the first angle detection track and detection of an angle by the second angle detection track are performed alternately.

Figure 11:
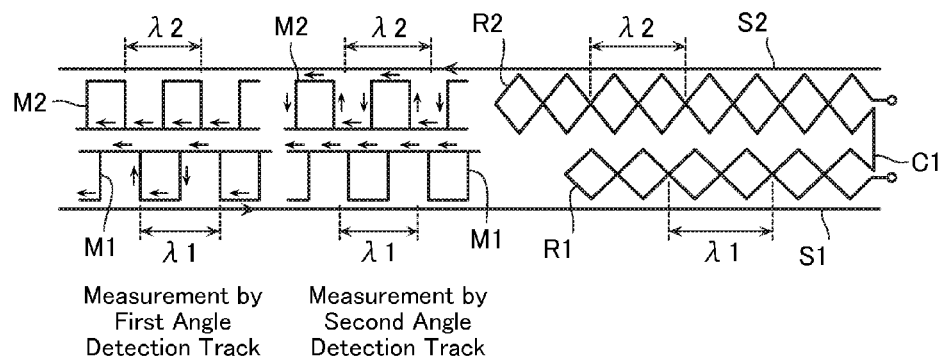
FIG. 11 is a schematic view showing an induced current generated in first and second magnetic flux coupling bodies M1 and M2 by a current flowing in the first and second transmission windings S1 and S2 according to same embodiment.

Next, detection of an angle by the first angle detection track will be described with reference to FIG. 11. When a current flows in the first transmission winding S1 clockwise, for example, a magnetic field is generated in a right screw direction in each of the current paths. Therefore, this magnetic field is coupled with the first magnetic flux coupling body M1 whereby a current flows in the first magnetic flux coupling body M1 counterclockwise.

In the first magnetic flux coupling body M1, mainly a current induced in the concave portion M12 is dominant. Therefore, a current induced in the first magnetic flux coupling body M1 flows mainly through the gear-shaped first current path L11 formed from the concave portions M12 and the convex portions M11. As a result, a magnetic field travelling from a front surface to a back surface of a plane of paper in FIG. 7 is generated in the concave portion M12 of the first magnetic flux coupling body M1, a magnetic field travelling from the back surface to the front surface of the plane of paper in FIG. 7 is generated in the convex portion M11 of the first magnetic flux coupling body M1, and these magnetic fields form a periodically magnetic pattern at the pitch λ1. These magnetic fields are received in the first reception winding R1. Now, the first reception winding R1 and the second reception winding R2 are commonly connected. Therefore, a current induced in the first reception winding R1 flows in the first and second reception windings R1 and R2 via the first contact wiring C1.

Moreover, in the case where a current is passed through the first transmission winding S1, a current flows almost entirely in the second current path L22 of the second magnetic flux coupling body M2, and a magnetic field generated by this current is uniform along a rotor circumference, hence a current due to the current path L22 is not generated in the reception winding R1. Moreover, although there is a possibility of a current flowing also in the first current path L21, the first magnetic flux coupling body M1 has a length of one circumference which is the pitch λ1×10 while the second magnetic flux coupling body M2 has a length of one circumference which is the pitch λ2×9. Hence, an influence of the magnetic field coupled with the first reception winding R1 is compensated by an influence of the magnetic field from the second magnetic flux coupling body M2 in the total of a one circumference portion. That is, an influence on the second reception winding R2 is compensated by the different pitches λ1 and λ2, and it becomes possible for measurement of an angle by the first angle detection track to be optimally performed.

Moreover, in the case where a spacing of the first and second angle detection tracks has been narrowed with a purpose of miniaturization, and so on, there is a risk of a current being induced to the second reception winding R2 by the first magnetic flux coupling body M1, but similarly, due to a difference in pitch of the first and second angle detection tracks, such an induced current is compensated and is substantially not detected.

Next, measurement of an angle by the second angle detection track will be described. When a current flows in the second transmission winding S2 clockwise, for example, a magnetic field is generated in a right screw direction in each of the current paths of the second transmission winding S2, and this magnetic field is coupled with the second magnetic flux coupling body M2 whereby a current flows in the second magnetic flux coupling body M2 counterclockwise.

Similarly to the case of measurement of an angle by the first angle detection track, measurement of an angle by the second angle detection track can also be optimally performed. That is, in the second magnetic flux coupling body M2, a current is induced in the gear-shaped first current path L21 thereby generating a magnetic field, an induced current flows in reception winding R2 by magnetic flux coupling of the second magnetic flux coupling body M2 and the second reception winding R2, and this induced current is detected, whereby measurement of an angle by the second angle detection track is performed. Furthermore, an influence exerted on the first reception winding R1 by the second magnetic flux coupling body M2 or an influence exerted on the second reception winding R2 by the first magnetic flux coupling body M1 are compensated by the difference in pitch of the first and second angle detection tracks and are substantially not detected.

[2. Second Embodiment]

Next, an inductive detection type rotary encoder 4-2 according to a second embodiment of the present invention will be described. In the first embodiment, an ABS type inductive detection type rotary encoder 4 of a configuration including two tracks was described, but in the second embodiment, an ABS type inductive detection type rotary encoder 4-2 of a configuration including four tracks will be described.

As shown in the first embodiment, for example, when it is assumed that one reception winding is configured from a group of three wirings, then each time the number of tracks increases by one, the number of lead-out wirings increases by six at a time. Therefore, normally when an ABS type inductive detection type rotary encoder having four tracks is configured, as many as 24 lead-out wirings become required for the reception windings. Therefore, a large amount of wiring space becomes necessary, and furthermore, a circuit scale of the control circuit also increases. However, if the present invention is applied to an ABS type inductive detection type rotary encoder of a configuration including four tracks, the number of lead-out wiring lines can be reduced to half, that is, 12, and the required wiring space and circuit scale can be reduced to about half.

Figure 12:
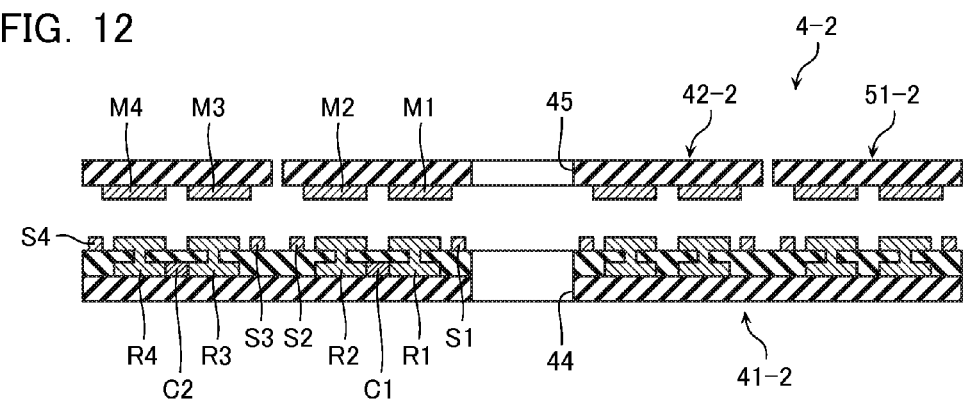
FIG. 12 is a cross-sectional side view showing a configuration of a stator 41-2 and first and second rotors 42-2 and 51-2 of an inductive detection type rotary encoder 4-2 according to a second embodiment.

[2-1. Stacked Structure of Inductive Detection Type]Rotary Encoder 4-2 According to Second Embodiment Next, a stacked structure of the inductive detection type rotary encoder 4-2 according to the present embodiment will be described with reference to FIG. 12. A stacked configuration of the inductive detection type rotary encoder 4-2 according to the present embodiment is substantially similar to the configuration of the inductive detection type rotary encoder 4 according to the first embodiment, but differs in the following points.

That is, in the present embodiment, a stator 41-2 includes first through fourth transmission windings S1 to S4 from the through hole 44 toward an outer side, a first reception winding R1 and a second reception winding R2 are disposed between the first transmission winding S1 and the second transmission winding S2, and a third reception winding R3 and a fourth reception winding R4 are disposed between the third transmission winding S3 and the fourth transmission winding S4. In addition, the first and second reception windings R1 and R2 are connected in series by a first contact wiring C1, and the third and fourth reception windings R3 and R4 are connected in series by a second contact wiring C2.

Furthermore, a first rotor 42-2 includes a first magnetic flux coupling body M1 and a second magnetic flux coupling body M2 from the through hole 45 toward an outer side, and a second rotor 51-2 includes a third magnetic flux coupling body M3 and a fourth magnetic flux coupling body M4 from a central direction toward an outside direction.

[2-2. Planar Structure of Inductive Detection Type]Rotary Encoder 4-2 According to Second Embodiment Next, a planar structure of the inductive detection type rotary encoder 4-2 according to the present embodiment will be described with reference to FIGS. 13 to 15.

Figure 13:
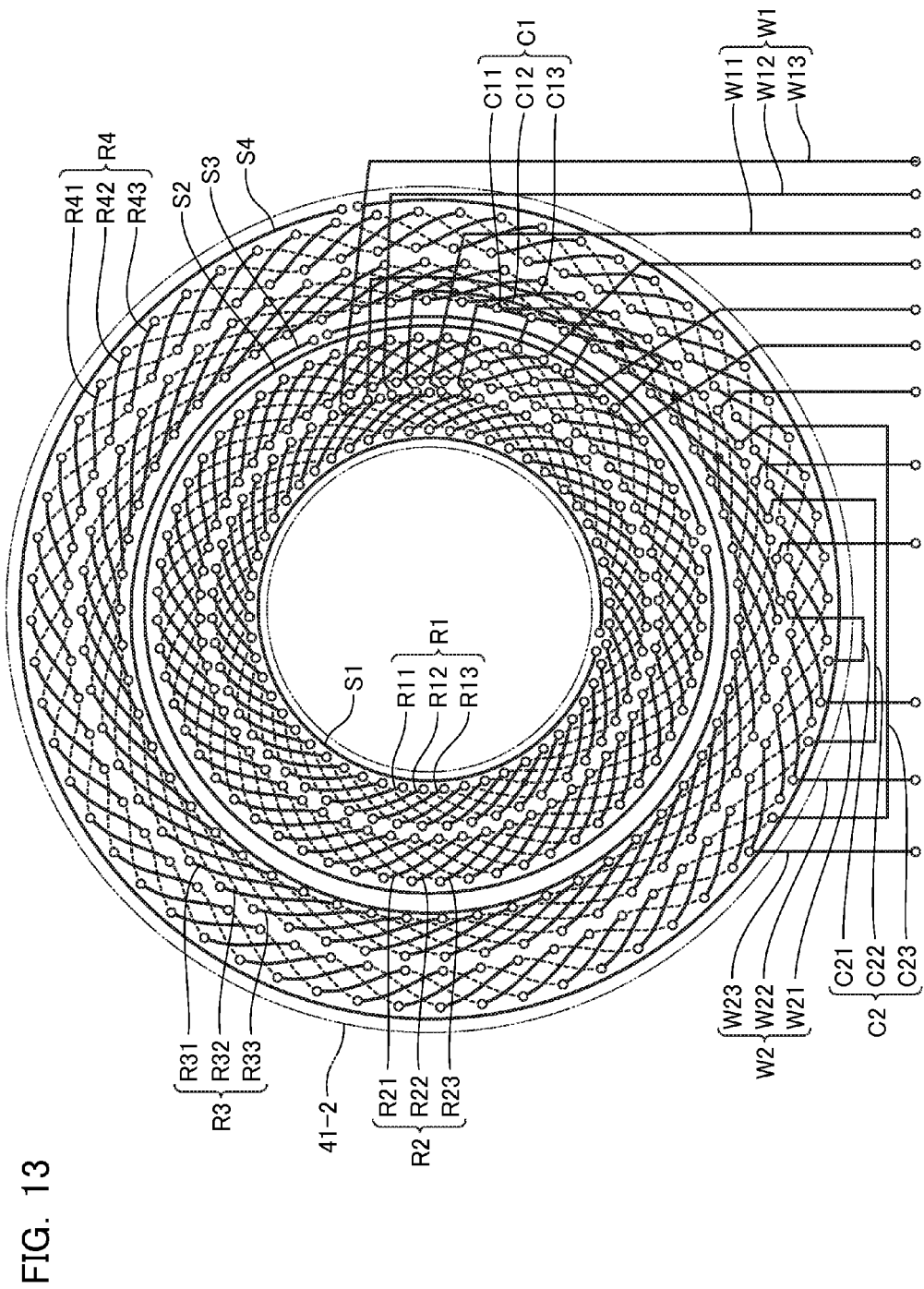
FIG. 13 is a plan view showing the configuration of the stator 41-2 of same inductive detection type rotary encoder 4-2.

FIG. 13 is a plan view showing a configuration of the stator 41-2 of the inductive detection type rotary encoder 4-2 according to the present embodiment. As mentioned above, the stator 41-2 according to the present embodiment is configured comprising the first through fourth transmission windings S1 to S4 and the first through fourth reception windings R1 to R4. In the present embodiment, configurations of the first transmission winding S1, the second transmission winding S2, the first reception winding R1, and the second reception winding R2 are similar to those in the first embodiment.

The third and fourth reception windings R3 and R4 are respectively configured from three reception windings R31 to R33 each having a different phase in a rotation direction and three reception windings R41 to R43 each having a different phase in a rotation direction, similarly to the first and second reception windings R1 and R2. Moreover, the third reception winding R3 is configured combining nine (N1) electric wire pairs formed in a loop shape (rhombic shape) similarly to the first reception winding R1, and the fourth reception winding R4 is configured combining 10 (N2) electric wire pairs formed in a loop shape (rhombic shape) similarly to the second reception winding R2. Now, the third and fourth reception windings R3 and R4 are disposed more to an outer side than the first and second transmission windings S1 and S2 and the first and second reception windings R1 and R2.

Therefore, a radius of the third and fourth reception windings R3 and R4 is larger compared to a radius of the first and second reception windings R1 and R2.

Moreover, in the present embodiment, a configuration of the contact wiring C1 (referred to below as first contact wiring) is also similar to that in the first embodiment. Furthermore, the stator 41-2 according to the present embodiment includes a second contact wiring C2 configured from wirings C21 to C23. The wirings C21 to C23 are connected in series to the reception windings R31 and R41, the reception windings R32 and R42, and the reception windings R33 and R43, respectively. Furthermore, the inductive detection type rotary encoder 4-2 according to the present embodiment includes a lead-out wiring W2 including wirings W21, W22 and W23. The wiring W21 is led out from the reception windings R31 and R41, the wiring W22 is led out from the reception windings R32, and the wiring W23 is led out from the reception windings R33 and R43. Note that in the present embodiment, the first reception winding R1 and second reception winding R2, and the third reception winding R3 and fourth reception winding R4 are respectively connected in series, but a different combination may also be adopted. For example, it is also possible to respectively connect the first reception winding R1 and third reception winding R3, and the second reception winding R2 and fourth reception winding R4. Note that if the second reception winding R2 and the third reception winding R3 are respectively connected, a reception signal flows simultaneously in second and third angle detection tracks, hence there is a risk that measurement accuracy ends up falling. Therefore, by respectively connecting the second reception winding R2 and third reception winding R3 to the first reception winding R1 or fourth reception winding R4, such a fall in measurement accuracy can be prevented.

Moreover, in the present embodiment, the numbers of electric wire pairs in the first reception winding R1 and third reception winding R3 and the second reception winding R2 and fourth reception winding R4 are configured to be equal, but the numbers of electric wire pairs configuring the third and fourth reception windings R3 and R4 may be appropriately adjusted, and may of course be set to different numbers from the numbers of electric wire pairs configuring the first and second reception windings R1 and R2.

Figure 14:
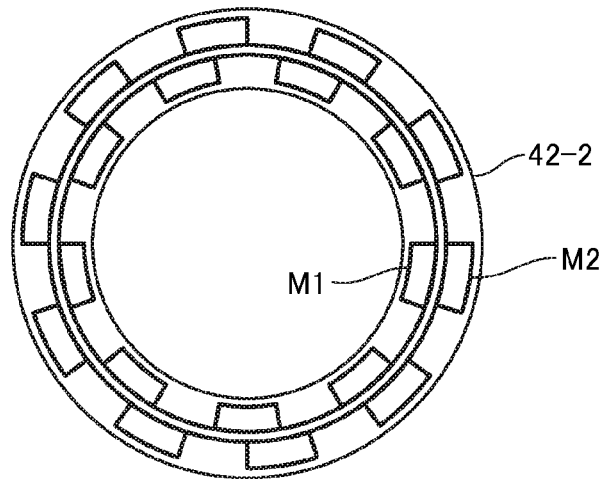
FIG. 14 is a plan view showing the configuration of the first rotor 42-2 of same inductive detection type rotary encoder 4-2.
Figure 15:
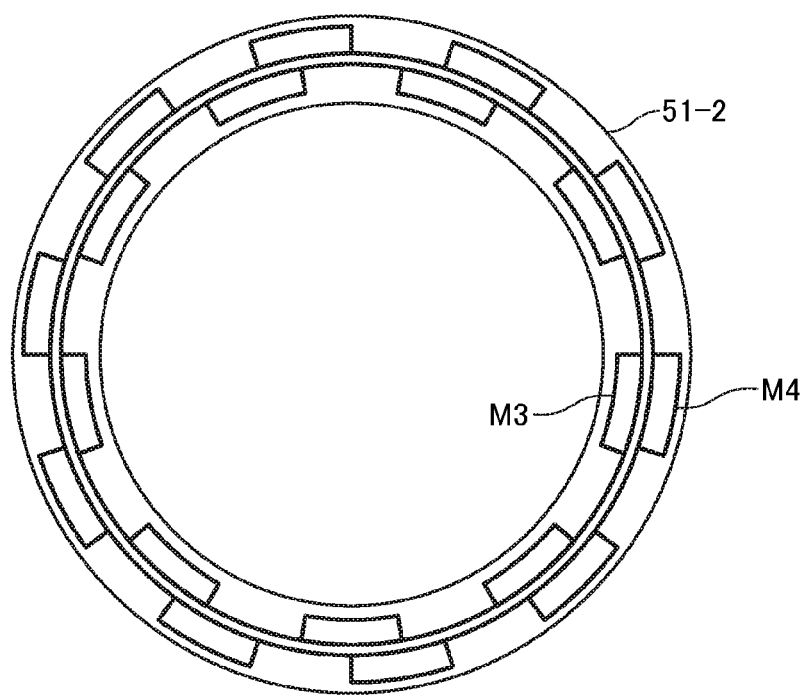
FIG. 15 is a plan view showing the configuration of the second rotor 51-2 of same inductive detection type rotary encoder 4-2.

FIG. 14 is a plane view showing a configuration of a first magnetic flux coupling body M1 and a second magnetic flux coupling body M2. FIG. 15 is a plane view showing a configuration of a third magnetic flux coupling body M3 and a fourth magnetic flux coupling body M4. The third magnetic flux coupling body M3 is configured substantially similarly to the first magnetic flux coupling body M1, and the fourth magnetic flux coupling body M4 is configured substantially similarly to the second magnetic flux coupling body M2. However, the third and fourth magnetic flux coupling bodies M3 and M4 have a larger radius compared to the first and second magnetic flux coupling bodies M1 and M2, so as to be magnetic flux coupled with the third and fourth reception windings R3 and R4, respectively.

[2-3. Operation of Inductive Detection Type Rotary]Encoder 4-2 According to Second Embodiment Next, operation of the inductive detection type rotary encoder 4-2 according to the present embodiment will be described. Operation of the inductive detection type rotary encoder 4-2 according to the present embodiment is substantially similar to that of the first embodiment, but differs in the following points. That is, the inductive detection type rotary encoder 4-2 according to the present embodiment has the first reception winding R1 and the second reception winding R2 connected in series and has the third reception winding R3 and the fourth reception winding R4 connected in series. Therefore, in the first embodiment, measurement by the first and second angle detection tracks is performed alternately by time division, but in the present embodiment, additionally, measurement by the third and fourth angle detection tracks is also performed alternately by time division. Note that measurement by signals received from different lead-out wirings, for example, measurement by the first angle detection track and measurement by the third angle detection track, and so on, can be performed simultaneously.

Note that in the second embodiment, comparing the rotation angles of the first rotor 42-2 and the second rotor 51-2 by the above-described transmission/reception control unit 6 and calculation processing unit 7 makes it possible for absolute position detection to be performed with sufficient accuracy within one revolution. In addition, the configuration according to the present embodiment makes it possible for the likes of component accuracy or assembly accuracy required of mechanism parts to be reduced and for a manufacturing burden to be lowered.

Moreover, in the present embodiment, the rotation angle of the second rotary encoder 50 with respect to the first rotary encoder 40 can be employed up to one revolution. Therefore, the present embodiment allows a length measurement range of the spindle 3 to be increased. Moreover, if the configuration of the present embodiment is applied to a device having an equivalent length measurement range to that of the present embodiment, then component accuracy and allowable assembly accuracy required of configurative parts can be reduced.

[3. Third Embodiment]

Figure 16:
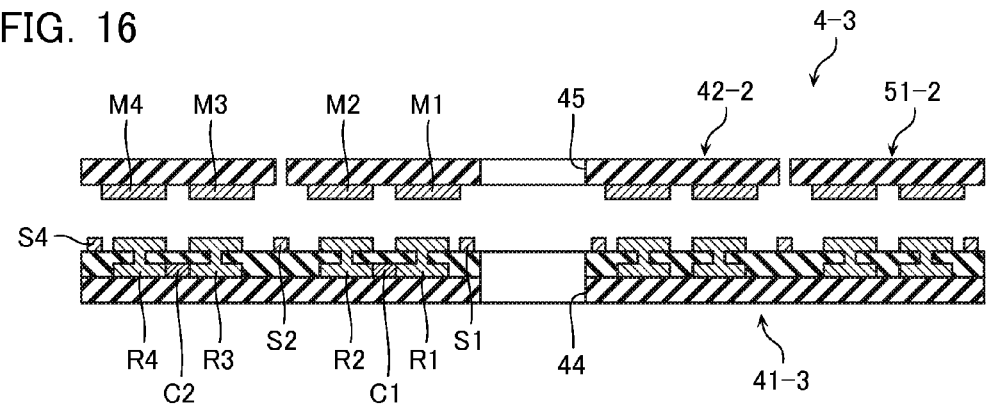
FIG. 16 is a cross-sectional side view showing a configuration of a stator 41-3 and first and second rotors 42-3 and 51-3 of an inductive detection type rotary encoder 4-3 according to a third embodiment.

[3-1. Configuration of Inductive Detection Type]Rotary Encoder 4-3 According to Third Embodiment Next, a configuration of an inductive detection type rotary encoder 4-3 according to a third embodiment will be described. The inductive detection type rotary encoder 4-3 according to the present embodiment is substantially similar to the inductive detection type rotary encoder 4-2 according to the second embodiment, but a configuration of a stator 41-3 thereof is different. That is, as shown in FIG. 16, the stator 41-3 of the inductive detection type rotary encoder 4-3 according to the present embodiment is configured omitting the third transmission winding S3, and has the second transmission winding S2 configured as a common transmission winding employed in the second and third angle detection tracks. Therefore, the inductive detection type rotary encoder according to the present embodiment has a smaller number of components and can adopt a simpler configuration than the inductive detection type rotary encoder according to the second embodiment.

Figure 17:
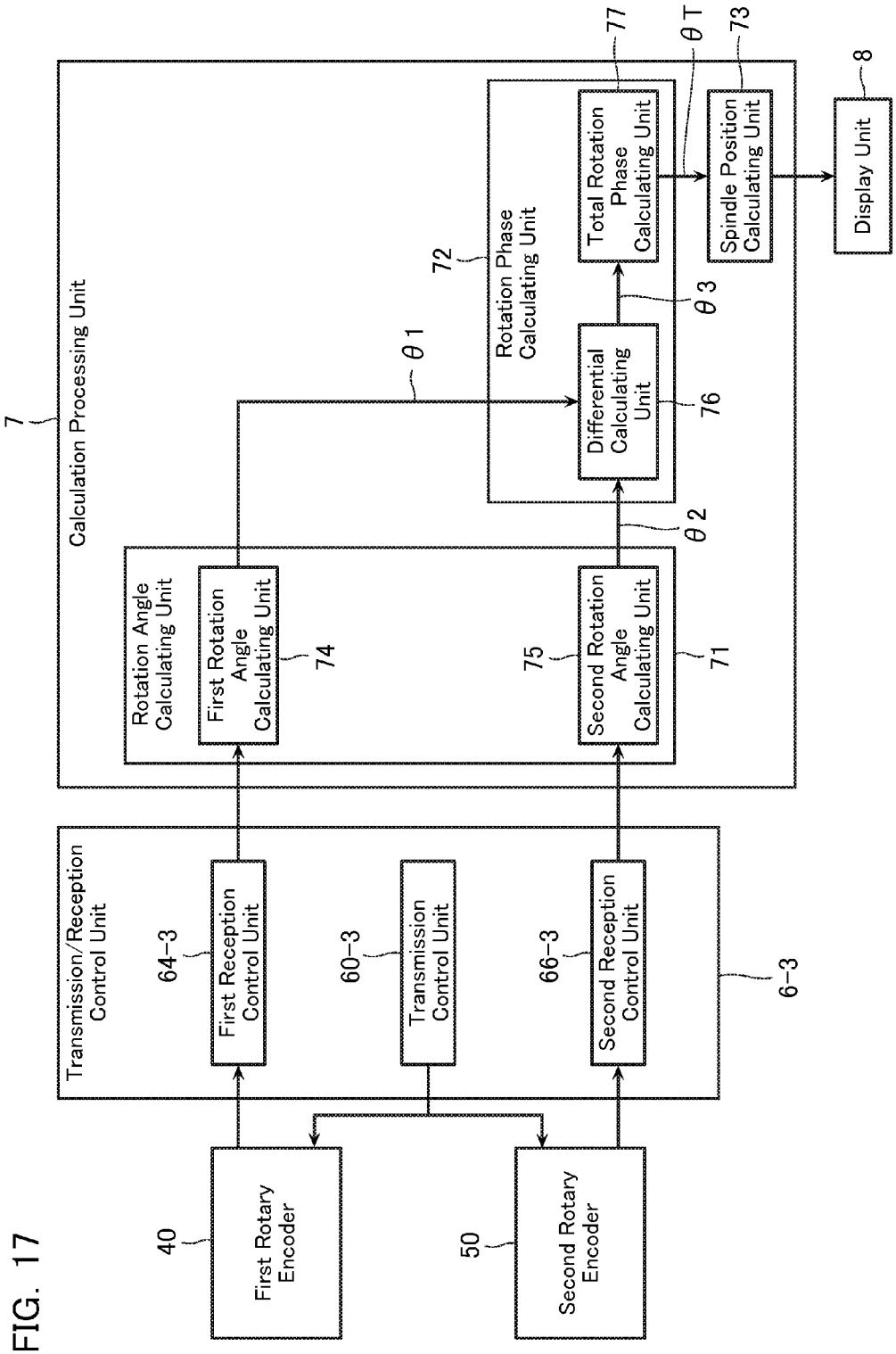
FIG. 17 is a block diagram showing a configuration of a transmission/reception control unit 6-3 and a calculation processing unit 7 of same embodiment.

In addition, the inductive detection type rotary encoder 4-3 according to the present embodiment has a configuration of a transmission/reception control unit 6-3 that differs from the configuration of the transmission/reception control unit 6 in the above-described first and second embodiments. That is, as shown in FIG. 17, the transmission/reception control unit 6-3 according to the present embodiment includes a transmission control unit 60-3, a first reception control unit 64-3, and a second reception control unit 66-3.

The transmission control unit 60-3 controls transmission of signals to the first and second rotary encoders 40 and 50. The transmission control unit 60-3 transmits a certain AC signal being for the first and second rotors 42-2 and 51-2 (for the first transmission winding S1, the second transmission winding S2, and the fourth transmission winding S4) to the stator 41-3.

The first reception control unit 64-3 receives a phase signal of the first rotor 42-2 from the stator 41-3 (from the first reception winding R1 and the second reception winding R2).

Now, the phase signal is a signal indicating a phase difference between a signal based on the first magnetic flux coupling body M1 and a signal based on the second magnetic flux coupling body M2.

The second reception control unit 66-3 receives a phase signal of the second rotor 51-2 from the stator 41-3 (from the third reception winding R3 and the fourth reception winding R4). Now, the phase signal is a signal indicating a phase difference between a signal based on the third magnetic flux coupling body M3 and a signal based on the fourth magnetic flux coupling body M4. The first reception control unit 64-3 and the second reception control unit 66-3 output the phase signals of the rotors 42-2 and 51-2 received from the stator 41-3 to a calculation processing unit 7.

Note that a configuration of the calculation processing unit 7 is similar to the configuration of the calculation processing unit 7 according to the first embodiment.

[3-2. Operation of Inductive Detection Type Rotary Encoder 4-3 According to Third Embodiment]

Figure 18:
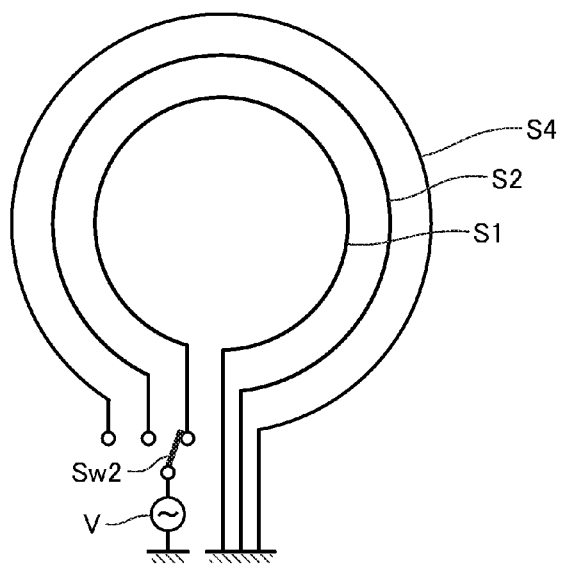
FIG. 18 is a circuit diagram showing a means for supplying a current to a first transmission winding S1, a second transmission winding S2, and a fourth transmission winding S4 according to same embodiment.

Next, operation of the inductive detection type rotary encoder 4-3 according to the third embodiment will be described. Operation of the inductive detection type rotary encoder 4-3 according to the present embodiment is substantially similar to operation of the inductive detection type rotary encoder 4-2 according to the second embodiment, but in the present embodiment, as shown in FIG. 18, a transmission current is supplied separately to the first transmission winding S1, the second transmission winding S2, and the fourth transmission winding S4 via a switch Sw2. In this point, the third embodiment differs from the second embodiment in which the transmission current is supplied simultaneously to the first transmission winding S1 and the third transmission winding S3. However, in the present embodiment, it is also possible for the transmission current to be supplied simultaneously to the first transmission winding S1 and the fourth transmission winding S4 and for measurement by the first and fourth angle detection tracks to be simultaneously performed.

[4. Fourth Embodiment]

Figure 19:
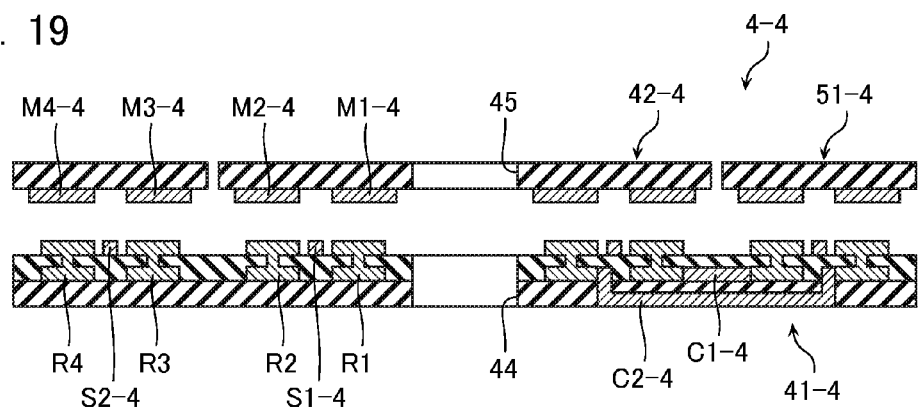
FIG. 19 is a cross-sectional side view showing a configuration of a stator 41-4 and first and second rotors 42-4 and 51-4 of an inductive detection type rotary encoder 4-4 according to a fourth embodiment.

Next, an inductive detection type rotary encoder 4-4 according to a fourth embodiment will be described. In the inductive detection type rotary encoder 4-4 according to the present embodiment, a configuration of a stator 41-4 differs from the configuration of the stator 41-2 according to the second embodiment. That is, as shown in FIG. 19, the stator 41-4 of the inductive detection type rotary encoder 4-4 according to the present embodiment has a first transmission winding S1-4 disposed between a first reception winding R1 and a second reception winding R2 and a second transmission winding S2-4 disposed between a third reception winding R3 and a fourth reception winding R4. Therefore, in the inductive detection type rotary encoder 4-2 according to the second embodiment, four transmission windings were provided, and in the inductive detection type rotary encoder 4-3 according to the third embodiment, three transmission windings were provided, but in the present embodiment, the number of transmission windings is further reduced to two, and a reduction in the number of components and a simplification of configuration can be achieved.

Note that in the present embodiment, detection of an angle by the first and second angle detection tracks is performed by inducing a transmission current in the first transmission winding S1-4, and detection of an angle by the third and fourth angle detection tracks is performed by inducing a transmission current in the second transmission winding S2-4. Therefore, the first reception winding R1 and the second reception winding R2 are respectively connected to the third reception winding R3 or the fourth reception winding R4. In the present embodiment, the second reception winding R2 and the third reception winding R3 are connected by a first contact wiring C1-4, and the first reception winding R1 and the fourth reception winding R4 are connected by a second contact wiring C2-4.

Figure 20:
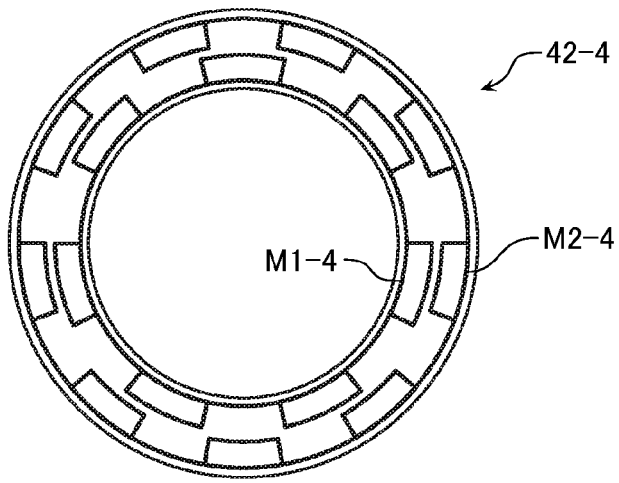
FIG. 20 is a plan view showing the configuration of the first rotor 42-4 of same inductive detection type rotary encoder 4-4.
Figure 21:
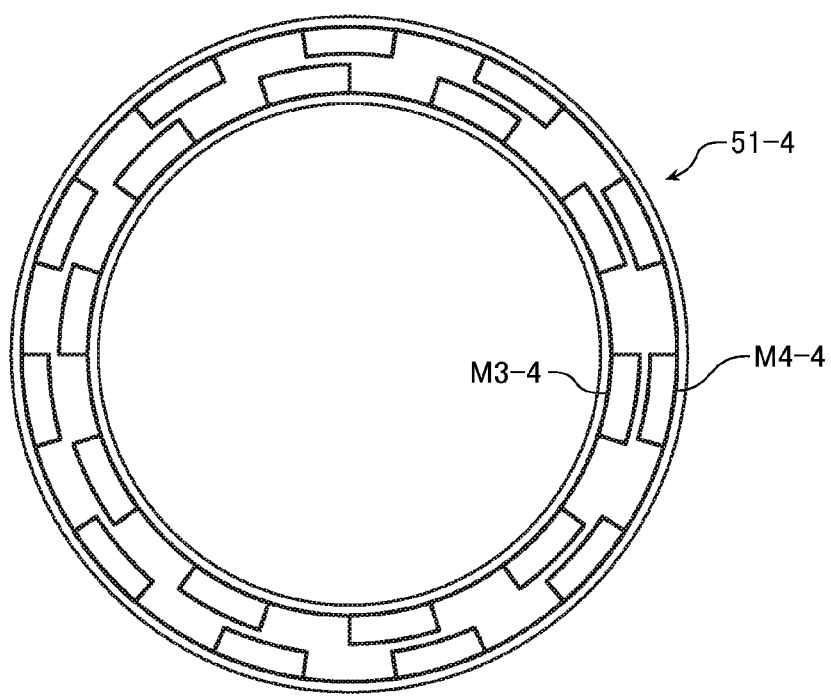
FIG. 21 is a plan view showing the configuration of the second rotor 51-4 of same inductive detection type rotary encoder 4-4.

In addition, the inductive detection type rotary encoder 4-4 according to the present embodiment has a configuration of a first rotor 42-4 and a second rotor 51-4 that differ from those of the inductive detection type rotary encoder 4-2 according to the second embodiment. That is, in the present embodiment, the first transmission winding S1-4 is positioned between the first reception winding R1 and the second reception winding R2 in plane view. Therefore, in the case of employing a first magnetic flux coupling body M1 similar to those of the first and second embodiments, for example, an induced current flowing in the annular second current path L12 is dominant, and there is a risk that measurement is not performed optimally. Therefore, as shown in FIG. 20, a first magnetic flux coupling body M1-4 according to the present embodiment is configured including a gear-shaped current path and a current path inscribing the gear-shaped current path. Moreover, as shown in FIG. 20, a second magnetic flux coupling body M2-4 is disposed more to an outer side than the induced first transmission winding S1-4, hence includes a gear-shaped current path and an annular current path circumscribing this gear-shaped current path. Note that FIG. 21 illustrates a configuration of a third magnetic flux coupling body M3-4 and a fourth magnetic flux coupling body M4-4 according to the present embodiment, but for similar reasons, the third magnetic flux coupling body M3-4 is configured substantially similarly to the first magnetic flux coupling body M1-4, and the fourth magnetic flux coupling body M4-4 is configured substantially similarly to the second magnetic flux coupling body M2-4.

[5. Fifth Embodiment]

Next, an inductive detection type rotary encoder 4-5 according to a fifth embodiment will be described. The second embodiment described an inductive detection type rotary encoder 4-2 of a configuration where four tracks are disposed in a planar surface, but in such a configuration, an outside diameter thereof ends up being large. The present embodiment adopts the inductive detection type rotary encoder 4-5 that includes four tracks and is miniaturized.

[5-1. Stacked Structure of Inductive Detection Type Rotary Encoder 4-5 According to Fifth Embodiment]

Figure 22:
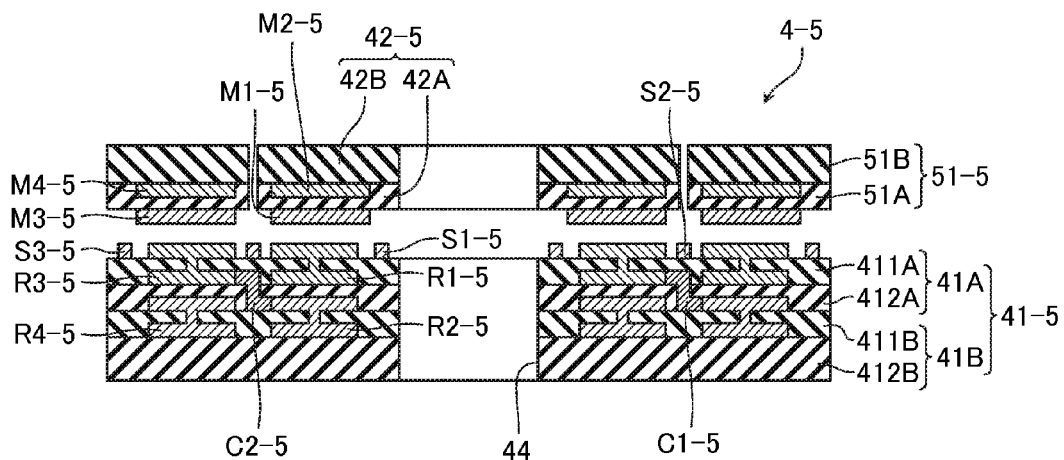
FIG. 22 is a cross-sectional side view showing a configuration of a stator 41-5 and first and second rotors 42-5 and 51-5 of an inductive detection type rotary encoder 4-5 according to a fifth embodiment.

Next, a stacked structure of a stator 41-5, a first rotor 42-5, and a second rotor 51-5 will be described with reference to FIG. 22. FIG. 22 is a cross-sectional view of the stator 41-5, the first rotor 42-5, and the second rotor 51-5. As shown in FIG. 22, the stator 41-5 includes a first wiring layer 41A and a second wiring layer 41B. The first wiring layer 41A includes a first reception winding R1-5 and a third reception winding R3-5 formed straddling over insulating layers 411A and 412A. In addition, the first wiring layer 41A is configured comprising a first transmission winding S1-5 between the through hole 44 and the first reception winding R1-5, a second transmission winding S2-5 between the first reception winding R1-5 and the third reception winding R3-5, and a third transmission winding S3-5 on an outer periphery of the third reception winding R3-5. The second wiring layer 41B includes a second reception winding R2-5 and a fourth reception winding R4-5 formed straddling over an insulating layer 411B and an insulating layer 412B. Furthermore, the first reception winding R1-5 and the fourth reception winding R4-5 are commonly connected by a first contact wiring C1-5, and the second reception winding R2-5 and the third reception winding R3-5 are commonly connected by a second contact wiring C2-5. The first rotor 42-5 includes a first magnetic flux coupling body M1-5 on a first wiring layer 42A, and includes a second magnetic flux coupling body M2-5 on a second wiring layer 42B. Moreover, the second rotor 51-5 includes a third magnetic flux coupling body M3-5 on a first wiring layer 51A, and includes a fourth magnetic flux coupling body M4-5 on a second wiring layer 51B.

[5-2. Planar Structure of Inductive Detection Type Rotary Encoder 4-5 According to Fifth Embodiment]

Next, a planar configuration on the stator 41-5, the first rotor 42-5, and the second rotor 51-5 will be described in detail with reference to FIGS. 23 to 28. FIGS. 23 to 28 are plane views respectively showing configurations of the first and second wiring layers 41A and 41B of the stator 41-5, the first and second wiring layers 42A and 42B of the first rotor 42-5, and the first and second wiring layers 51A and 51B of the second rotor 51-5.

Figure 23:
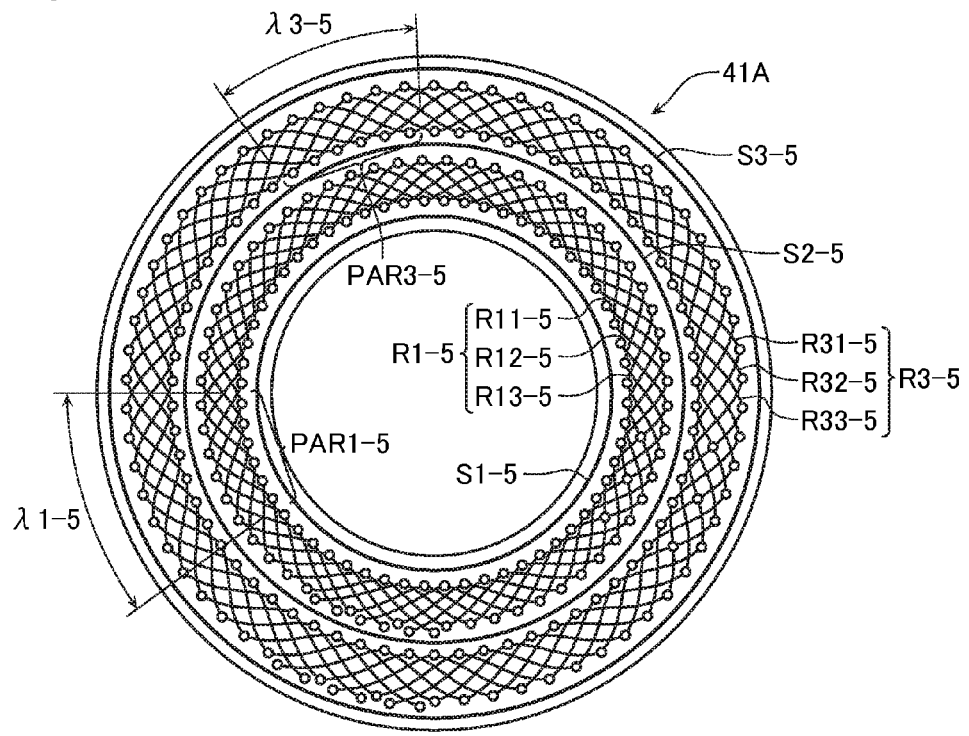
FIG. 23 is a plan view showing a configuration on a first wiring layer 41A configuring the stator 41-5 of same embodiment.

As shown in FIG. 23, the first transmission winding S1-5, the second transmission winding S2-5, and the third transmission winding S3-5 are provided coaxially to the spindle 3 on the first wiring layer 41A of the stator 41-5 facing the first and second rotors 42-5 and 51-5. The first transmission winding S1-5 is formed in a substantially circular shape with a first diameter from the spindle 3 (rotational axis). The second transmission winding S2-5 is formed in a substantially circular shape with a second diameter larger than the first diameter from the spindle 3 (rotational axis). The third transmission winding S3-5 is formed in a substantially circular shape with a third diameter larger than the second diameter from the spindle 3 (rotational axis).

In addition, as shown in FIG. 23, the first reception winding R1-5 and the third reception winding R3-5 are provided coaxially to the spindle 3 on the first wiring layer 41A of the stator 41-5 facing the first and second rotors 42-5 and 51-5. The first reception winding R1-5 is formed between the first transmission winding S1-5 and the second transmission winding S2-5. The third reception winding R3-5 is formed between the second transmission winding S2-5 and the third transmission winding S3-5. The first reception winding R1-5 detects magnetic flux generated by the first magnetic flux coupling body M1-5. The third reception winding R3-5 detects magnetic flux generated by the third magnetic flux coupling body M3-5.

The first reception winding R1-5 is configured by three reception windings R11-5, R12-5, and R13-5 having different phases in a rotation direction. The reception windings R11-5, R12-5, and R13-5 are each configured from an electric wire disposed in a loop shape (rhombic shape). Crossing portions of the reception windings R11-5, R12-5, and R13-5 are arranged above and below a substrate in order to prevent the crossing portions from short-circuiting, and are connected to each other by a via hole to be disposed insulated and isolated. Note that the second reception winding R2-5, the third reception winding R3-5, and the fourth reception winding R4-5 are also configured substantially similarly to the first reception winding R1-5.

Figure 24:
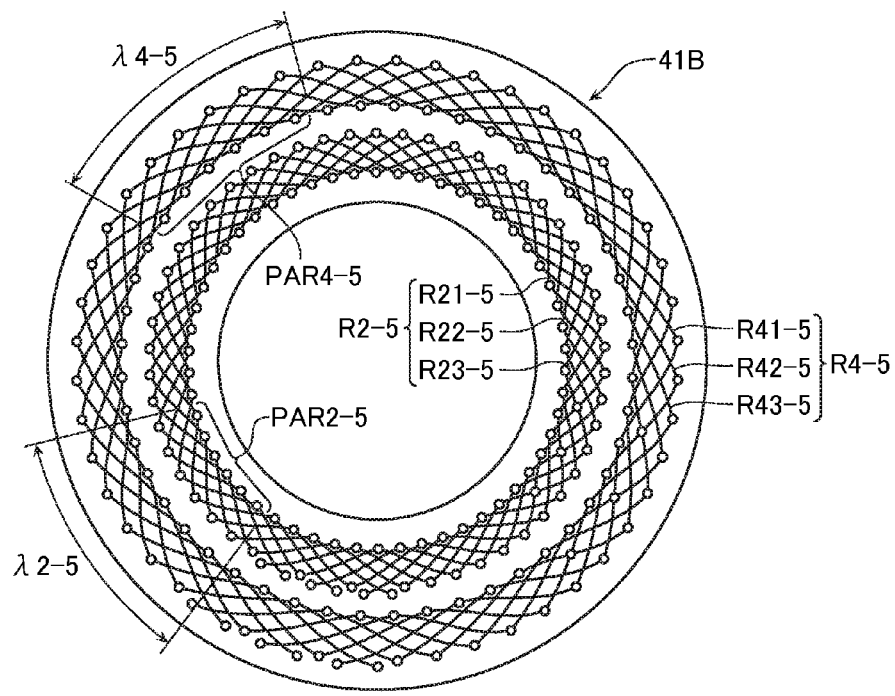
FIG. 24 is a plan view showing a configuration on a second wiring layer 41B configuring the stator 41-5 of same embodiment.

Furthermore, as shown in FIG. 24, the second reception winding R2-5 and the fourth reception winding R4-5 are provided coaxially to the spindle 3 on the second wiring layer 41B of the stator 41-5 facing the first and second rotors 42-5 and 51-5. The second reception winding R2-5 is formed at a corresponding position between the first transmission winding S1-5 and the second transmission winding S2-5, similarly to the first reception winding R1-5. Moreover, the fourth reception winding R4-5 is formed at a corresponding position between the second transmission winding S2-5 and the third transmission winding S3-5, similarly to the third reception winding R3-5. The second reception winding R2-5 detects magnetic flux generated by the second magnetic flux coupling body M2-5. The fourth reception winding R4-5 detects magnetic flux generated by the fourth magnetic flux coupling body M4-5.

Figure 25:
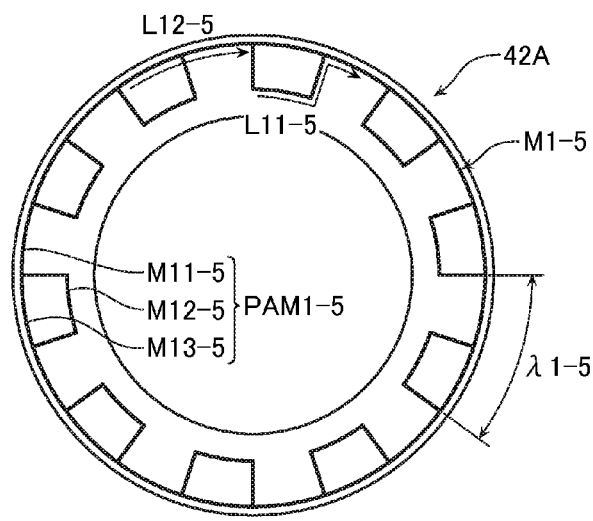
FIG. 25 is a plan view showing a configuration on a first wiring layer 42A configuring the first rotor 42-5 of same embodiment.
Figure 26:
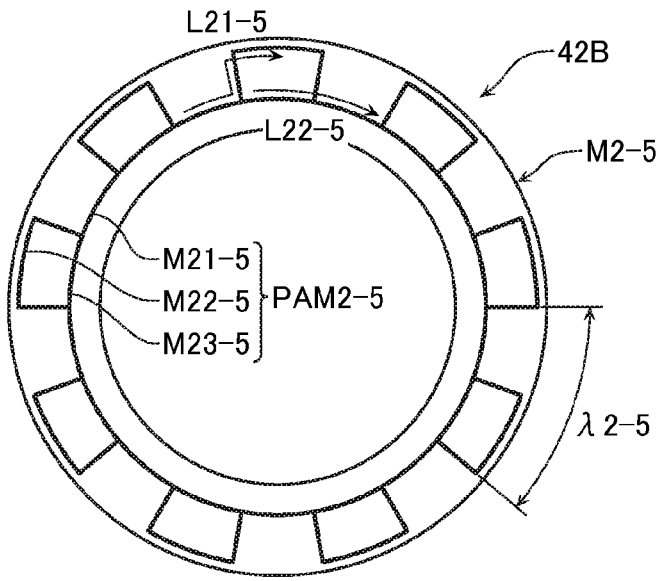
FIG. 26 is a plan view showing a configuration on a second wiring layer 42B configuring the first rotor 42-5 of same embodiment.

As shown in FIGS. 25 and 26, the first magnetic flux coupling body M1-5 and the second magnetic flux coupling body M2-5 are provided coaxially to the spindle 3 on the first rotor 42-5 facing the stator 41-5. The first magnetic flux coupling body M1-5 and the second magnetic flux coupling body M2-5 are stacked via an insulating layer, and the first magnetic flux coupling body M1-5 is configured to be capable of magnetic flux coupling with the first transmission winding S1-5. The second magnetic flux coupling body M2-5 is configured to be capable of magnetic flux coupling with the second transmission winding S2-5.

The first magnetic flux coupling body M1-5 is formed having, for example, 10 (N1-3) wiring patterns PAM1-5 circularly connected therein. The first magnetic flux coupling body M1-5 includes a wiring of a shape that has overlapped therein shapes of a continuous gear-shaped wiring portion that changes periodically in the rotation direction of the first rotor 42-5 with a pitch $\lambda 1$-5, and a circular shaped wiring portion circumscribing this gear-shaped wiring portion. More specifically, the first magnetic flux coupling body M1-5 alternately configures a convex portion M11-5 protruding in a direction moving away from the spindle 3 and a concave portion M12-5 receding in a direction approaching the spindle 3. Moreover, the first magnetic flux coupling body M1-5 includes an annular joining portion M13-5 that joins a plurality of the convex portions M11-5. That is, a plurality of the concave portions M12-5 and the convex portions M11-5 form a gear-shaped first current path L11-5, and a plurality of the convex portions M11-5 and the joining portions M13-5 form an annular second current path L12-5.

The second magnetic flux coupling body M2-5 is formed having, for example, nine (N2-3) wiring patterns PAM2-5 circularly connected therein. That is, the number of wiring patterns PAM2-5 of the second magnetic flux coupling body M2-5 differs by one from the number of wiring patterns PAM1-5 of the first magnetic flux coupling body M1-5. The second magnetic flux coupling body M2-5 includes a wiring of a shape that has overlapped therein shapes of a continuous gear-shaped wiring portion that changes periodically in the rotation direction of the first rotor 42-5 with a pitch $\lambda 2$-5, and a circular shaped wiring portion inscribing this gear-shaped wiring portion. More specifically, the second magnetic flux coupling body M2-5 alternately configures a concave portion M21-5 receding in a direction approaching the spindle 3 and a convex portion M22-5 protruding in a direction moving away from the spindle 3. Moreover, the second magnetic flux coupling body M2-5 includes an annular joining portion M23-5 that joins a plurality of the concave portions M21-5. That is, a plurality of the concave portions M21-5 and the convex portions M22-5 form a gear-shaped first current path L21-5, and a plurality of the concave portions M21-5 and the joining portions M23-5 form an annular second current path L22-5.

Figure 27:
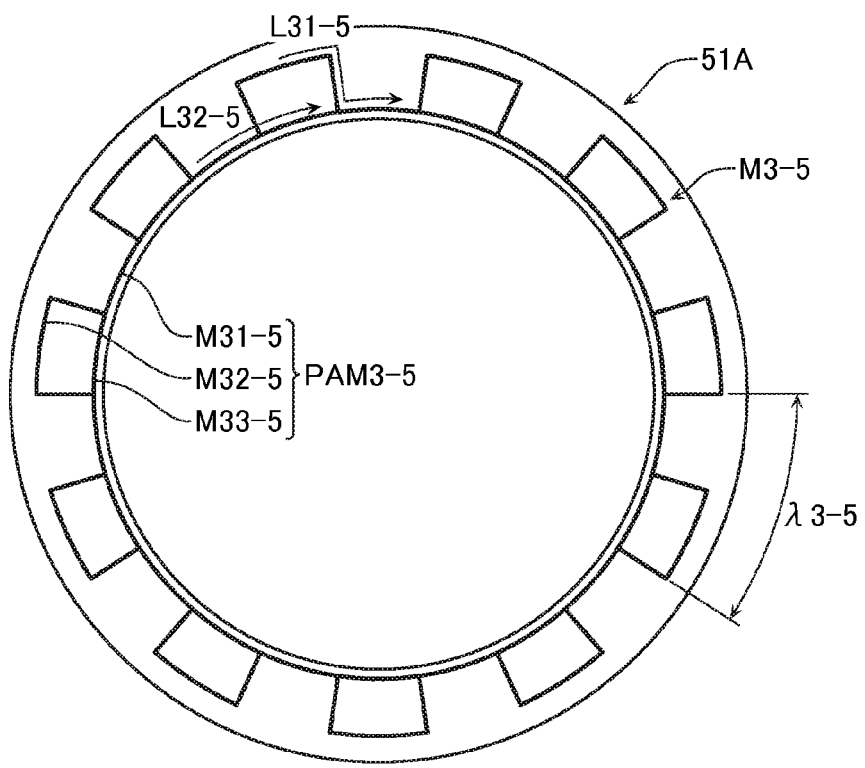
FIG. 27 is a plan view showing a configuration on a first wiring layer 51A configuring the second rotor 51-5 of same embodiment.
Figure 28:
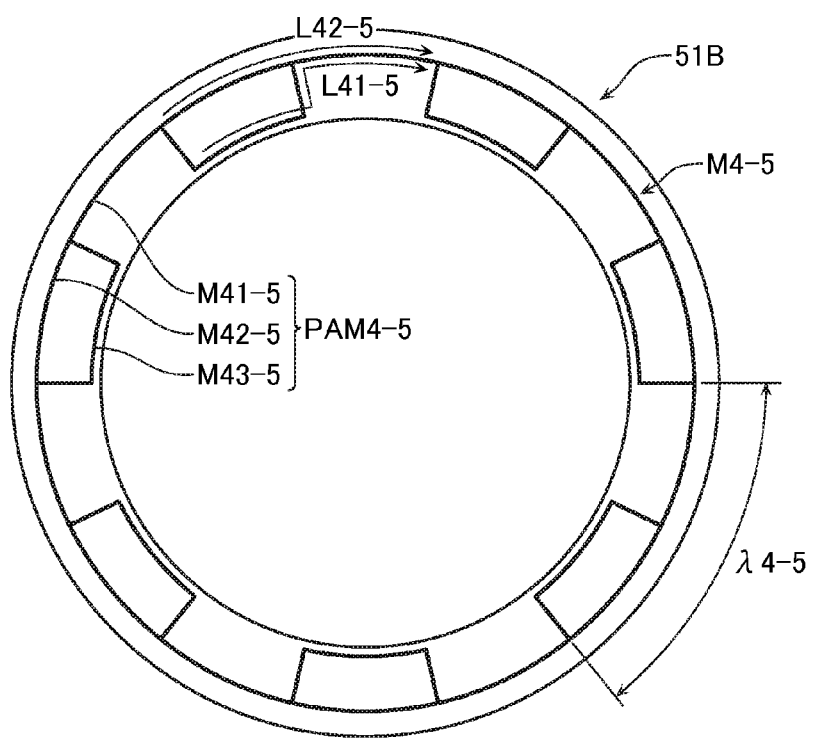
FIG. 28 is a plan view showing a configuration on a second wiring layer 51B configuring the second rotor 51-5 of same embodiment.

As shown in FIGS. 27 and 28, the third magnetic flux coupling body M3-5 and the fourth magnetic flux coupling body M4-5 are provided coaxially to the spindle 3 on the second rotor 51-5 facing the stator 41-5. The third magnetic flux coupling body M3-5 and the fourth magnetic flux coupling body M4-5 are stacked via an insulating layer, and the third magnetic flux coupling body M3-5 is configured to be capable of magnetic flux coupling with the third transmission winding S3-5. The fourth magnetic flux coupling body M4-5 is configured to be capable of magnetic flux coupling with the second transmission winding S2-5.

The third magnetic flux coupling body M3-5 is formed having, for example, 11 (N3-3) wiring patterns PAM3-5 therein. The fourth magnetic flux coupling body M4-5 is formed in a gear shape having, for example, seven (N4-3) wiring patterns PAM4-5 therein. Note that the wiring pattern PAM3-5 is formed substantially similarly to the above-described wiring pattern PAM2-5, and the wiring pattern PAM4-5 is formed substantially similarly to the above-described wiring pattern PAM1-5.

Note that in the present embodiment, N1-5, N2-5, N3-5, and N4-5 are aldifferent numbers, and greatest common factors of one and another of these numbers are all 1. Therefore, magnetic fields generated in the first through fourth magnetic flux coupling bodies M1-5, M2-5, M3-5, and M4-5 respectively induce a current only in the corresponding first through fourth reception windings R1-5, R2-5, R3-5, and R4-5. This is because currents induced by magnetic flux coupling bodies in non-corresponding magnetic flux coupling bodies all cancel each other out to be zero. In the present embodiment, such a configuration results in crosstalk in the first through fourth angle detection tracks being reduced and further improvement in measurement accuracy being achieved.

[5-3. Operation of Inductive Detection Type Rotary Encoder 4-5 According to Fifth Embodiment]

Next, operation of the present embodiment comprising such a configuration will be described. First, an operating principle of the rotary encoder according to the present embodiment will be described.

The first through third transmission windings S1-5, S2-5, and S3-5 have a periodically changing transmission current passed therethrough in an arbitrary order, that is, by time division. In the present embodiment, the first transmission winding S1-5 is employed during detection of an angle by the first angle detection track, the second transmission winding S2-5 is employed during detection of an angle by the second and fourth angle detection tracks, and the third transmission winding S3-5 is employed during detection of an angle by the third angle detection track.

Figure 29:
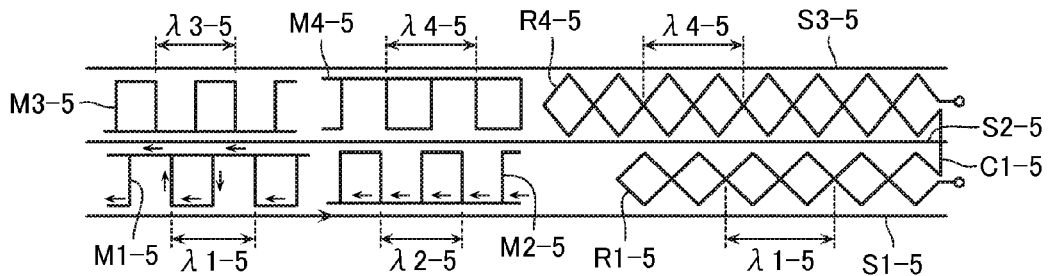
FIG. 29 is a schematic view showing a situation when a signal of a first track is received, in same embodiment.

First, detection of an angle by the first angle detection track will be described with reference to FIGS. 25 and 29. When a current flows in the first transmission winding S1-5 clockwise, for example, a magnetic field is generated in a right screw direction in the current path of the first transmission winding S1-5. Therefore, this magnetic field is coupled with the first and second magnetic flux coupling bodies M1-5 and M2-5 whereby a current flows in the first and second magnetic flux coupling bodies M1-5 and M2-5 counterclockwise.

In the first magnetic flux coupling body M1-5, mainly a current induced in the concave portion M12-5 is dominant. Therefore, a current induced in the first magnetic flux coupling body M1-5 flows mainly through the gear-shaped first current path L11-5 formed from the concave portions M12-5 and the convex portions M11-5. As a result, magnetic field travelling from a front surface to a back surface of a plane of paper in FIG. 29 is generated in the concave portion M12-5 of the first magnetic flux coupling body M1-5, a magnetic field travelling from the back surface to the front surface of the plane of paper in FIG. 29 is generated in the convex portion M11-5 of the first magnetic flux coupling body M1-5, and these magnetic fields form a periodically magnetic pattern at the pitch $\lambda 1$-5. These magnetic fields are received in the first reception winding R1-5. Now, the first reception winding R1-5 is commonly connected to the fourth reception winding R4-5. Therefore, a current induced in the first reception winding R1-5 flows in the first and fourth reception windings R1-5 and R4-5.

Moreover, in the second magnetic flux coupling body M2-5, a current is induced in the concave portions M21-5 and the joining portions M23-5, and a current flows mainly in the annular second current path L22-5. A current flowing in the gear-shaped first current path L21-5 configured from the concave portions M21-5 and the convex portions M22-5 has a value about one tenth of that of the current flowing in the second current path L22-5. Therefore, the magnetic field forming the magnetic pattern of pitch $\lambda 2$-5 generated in the second magnetic flux coupling body M2-5 is extremely small compared to the magnetic field forming the magnetic pattern of pitch $\lambda 1$-5 generated in the first magnetic flux coupling body M1-5. Moreover, the first magnetic flux coupling body M1-5 has a length of one circumference which is the pitch $\lambda 1$-5×10 while the second magnetic flux coupling body M2-5 has a length of one circumference which is the pitch $\lambda 2$-5×9. Hence, as shown in FIG. 29, an influence of the magnetic field coupled with the first reception winding R1-5 is compensated by an influence of the magnetic field from the second magnetic flux coupling body M2-5 in the total of a one circumference portion. That is, in the first reception winding R1-5, an induced voltage caused by the second magnetic flux coupling body M2-5 is canceled out by the different pitches $\lambda 1$-5 and $\lambda 2$-5, hence a signal thereof is not detected. That is, in the first reception winding R1-5, crosstalk from the second magnetic flux coupling body M2-5 can be suppressed. In addition, the third and fourth magnetic flux coupling bodies M3-5 and M4-5 are separated from the first transmission winding S1-5 by a greater distance compared to the first and second magnetic flux coupling bodies M1-5 and M2-5, hence currents induced therein by the first transmission winding S1-5 are negligibly small.

Figure 30:
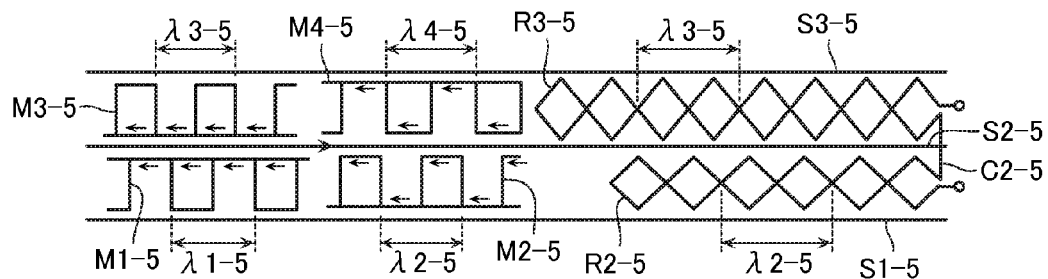
FIG. 30 is a schematic view showing a situation when a signal of a second track is received, in same embodiment.
Figure 31:
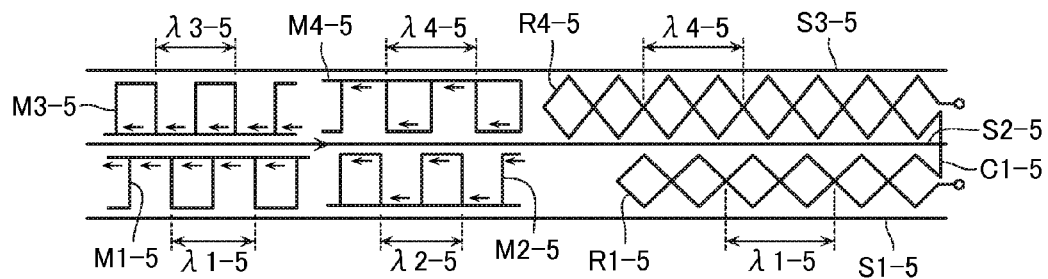
FIG. 31 is a schematic view showing a situation when a signal of a third track is received, in same embodiment.

Next, detection of an angle by the second and fourth angle detection tracks will be described with reference to FIGS. 26, 30, and 31. When a current flows in the second transmission winding S2-5 clockwise, for example, a current flows in the first through fourth magnetic flux coupling bodies M1-5, M2-5, M3-5, and M4-5 counterclockwise.

In the second magnetic flux coupling body M2-5, a current induced in the convex portion M22-5 is dominant. Therefore, a current flows mainly through the gear-shaped first current path L21-5 formed from the concave portions M21-5 and the convex portions M22-5. As a result, a magnetic field travelling from a front surface to a back surface of a plane of paper in FIG. 26 is generated in the concave portion M21-5 of the second magnetic flux coupling body M2-5, a magnetic field travelling from the back surface to the front surface of the plane of paper in FIG. 26 is generated in the convex portion M22-5 of the second magnetic flux coupling body M2-5, and these magnetic fields form a periodically magnetic pattern at the pitch $\lambda 2$-5. These magnetic fields are received in the second reception winding R2-5. The second reception winding R2-5 and the third reception winding R3-5 are commonly connected, hence a current induced in the second reception winding R2-5 flows in the second and third reception windings R2-5 and R3-5.

In the fourth magnetic flux coupling body M4-5, a current induced in the concave portion M42-5 is dominant. Therefore, a current flows mainly through the gear-shaped first current path L41-5 formed from the concave portions M42-5 and the convex portions M41-5. As a result, a magnetic field travelling from a front surface to a back surface of a plane of paper in FIG. 28 is generated in the concave portion M42-5 of the fourth magnetic flux coupling body M4-5, a magnetic field travelling from the back surface to the front surface of the plane of paper in FIG. 28 is generated in the convex portion M41-5 of the fourth magnetic flux coupling body M4-5, and these magnetic fields form a periodically magnetic pattern at the pitch $\lambda$4-5. These magnetic fields are received in the fourth reception winding R4-5. The fourth reception winding R4-5 and the first reception winding R1-5 are commonly connected, hence a current induced in the fourth reception winding R4-5 flows in the first and fourth reception windings R1-5 and R4-5.

In the present embodiment, the second and fourth reception windings R2-5 and R4-5 that detect the magnetic fields of magnetic flux coupling bodies in which a current is induced simultaneously are not connected, and the first and fourth reception windings R1-5 and R4-5 and the second and third reception windings R2-5 and R3-5 that are employed independently by time division, that is, in which a current is induced at different timings, are commonly connected. Therefore, detection of an angle by the second and fourth angle detection tracks can be performed simultaneously, and furthermore, the number of components can be reduced compared to a conventional configuration. Moreover, in the present embodiment, the first and fourth reception windings R1-5 and R4-5 are commonly connected, and furthermore, the second and third reception windings R2-5 and R3-5 are commonly connected. In such a configuration, commonly connected reception windings are not overlapped in a stacking direction, hence crosstalk can be optimally reduced.

On the other hand, in the first magnetic flux coupling body M1-5, a current is induced in the convex portions M11-5 and the joining portions M13-5, and a current flows mainly in the annular second current path L12-5. Therefore, similarly to in the above-described case, the magnetic field forming the magnetic pattern of pitch $\lambda$1-5 generated in the first magnetic flux coupling body M1-5 is extremely small compared to the magnetic field forming the magnetic pattern of pitch $\lambda$2-5 generated in the second magnetic flux coupling body M2-5. In addition, even if a current is induced in the second reception winding R2-5 by a certain magnetic field, that current is canceled out and almost never detected, due to a difference in phases between the first magnetic flux coupling body M1-5 and the second reception winding R2-5. Moreover, similarly in the third magnetic flux coupling body M3-5, a current flows in the annular second current path L32-5, hence there is substantially no influence on detection of a signal.

Figure 32:
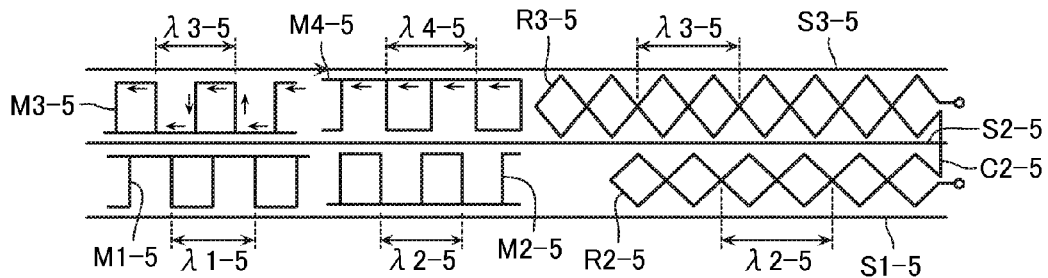
FIG. 32 is a schematic view showing a situation when a signal of a fourth track is received, in same embodiment.

Next, detection of an angle by the third angle detection track will be described with reference to FIGS. 27 and 32. When a current flows in the third transmission winding S3-5 clockwise, for example, a magnetic field is generated in a right screw direction in the current path of the third transmission winding S3-5. Therefore, this magnetic field is coupled with the third and fourth magnetic flux coupling bodies M3-5 and M4-5 whereby a current flows in the third and fourth magnetic flux coupling bodies M3-5 and M4-5 counterclockwise.

In the third magnetic flux coupling body M3-5, mainly a current induced in the convex portion M32-5 is dominant. Therefore, a current induced in the third magnetic flux coupling body M3-5 flows mainly through the gear-shaped first current path L31-5 formed from the concave portions M31-5 and the convex portions M32-5. As a result, a magnetic field travelling from a front surface to a back surface of a plane of paper in FIG. 27 is generated in the concave portion M31-5 of the third magnetic flux coupling body M3-5, a magnetic field travelling from the back surface to the front surface of the plane of paper in FIG. 27 is generated in the convex portion M32-5 of the third magnetic flux coupling body M3-5, and these magnetic fields form a periodically magnetic pattern at the pitch $\lambda$3-5. These magnetic fields are received in the third reception winding R3-5. Now, the third reception winding R3-5 is commonly connected to the second reception winding R2-5. Therefore, a current induced in the third reception winding R3-5 flows in the second and third reception windings R2-5 and R3-5.

Moreover, in the fourth magnetic flux coupling body M4-5, a current is induced in the convex portions M41-5 and the joining portions M42-5, and a current flows mainly in the annular second current path L42-5. A current flowing in the gear-shaped first current path L41-5 configured from the concave portions M43-5 and the convex portions M41-5 has a value about one tenth of that of the current flowing in the second current path L42-5. Therefore, the magnetic field forming the magnetic pattern of pitch $\lambda$4-5 generated in the fourth magnetic flux coupling body M4-5 is extremely small compared to the magnetic field forming the magnetic pattern of pitch $\lambda$3-5 generated in the third magnetic flux coupling body M3-5. Moreover, the third magnetic flux coupling body M3-5 has a length of one circumference which is the pitch ($\lambda$3-5)×11 while the fourth magnetic flux coupling body M4-5 has a length of one circumference which is the pitch ($\lambda$4-5)×7. Hence, as shown in FIG. 32, an influence of the magnetic field coupled with the third reception winding R3-5 is compensated by an influence of the magnetic field from the fourth magnetic flux coupling body M4-5 in the total of a one circumference portion. That is, in the third reception winding R3-5, an induced voltage caused by the fourth magnetic flux coupling body M4-5 is canceled out by the different pitches $\lambda$3-5 and $\lambda$4-5, hence a signal thereof is not detected. That is, in the third reception winding R3-5, crosstalk from the fourth magnetic flux coupling body M4-5 can be suppressed. In addition, the first and second magnetic flux coupling bodies M1-5 and M2-5 are separated from the third transmission winding S3-5 by a greater distance compared to the third and fourth magnetic flux coupling bodies M3-5 and M4-5, hence currents induced therein by the third transmission winding S3-5 are negligibly small.

As is clear from the above, reception signals that change according to a position of the first and second rotors 42-5 and 51-5 with respect to the stator 41-5 are obtained from the first through fourth reception windings R1-5, R2-5, R3-5, and R4-5 can be detected. Reception signals detected from the first and second angle detection tracks are misaligned by a one cycle portion while the first rotor 42-5 makes one revolution, hence an absolute position can be detected from the two reception signals in one revolution. Moreover, reception signals detected from the third and fourth angle detection tracks are also similarly misaligned by a one cycle portion while the second rotor 51-5 makes one revolution, hence an absolute position can be detected from the two reception signals in one revolution.

Note that a configuration and operation of the micrometer head 1 according to the present embodiment are substantially similar to the configuration and operation of the micrometer head 1 according to the first embodiment. Furthermore, a configuration and operation of the transmission/reception control unit 6 and the calculation processing unit 7 according to the present embodiment are substantially similar to the configuration and operation in the second embodiment.

[6. Sixth Embodiment]

Figure 33:
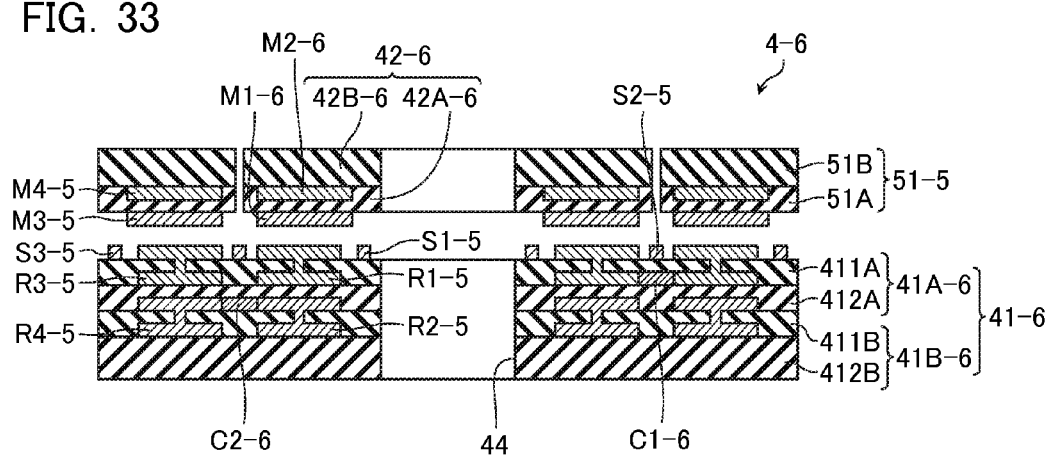
FIG. 33 is a cross-sectional side view showing a configuration of a stator 41-6 and first and second rotors 42-6 and 51-5 according to a sixth embodiment.
Figure 34:
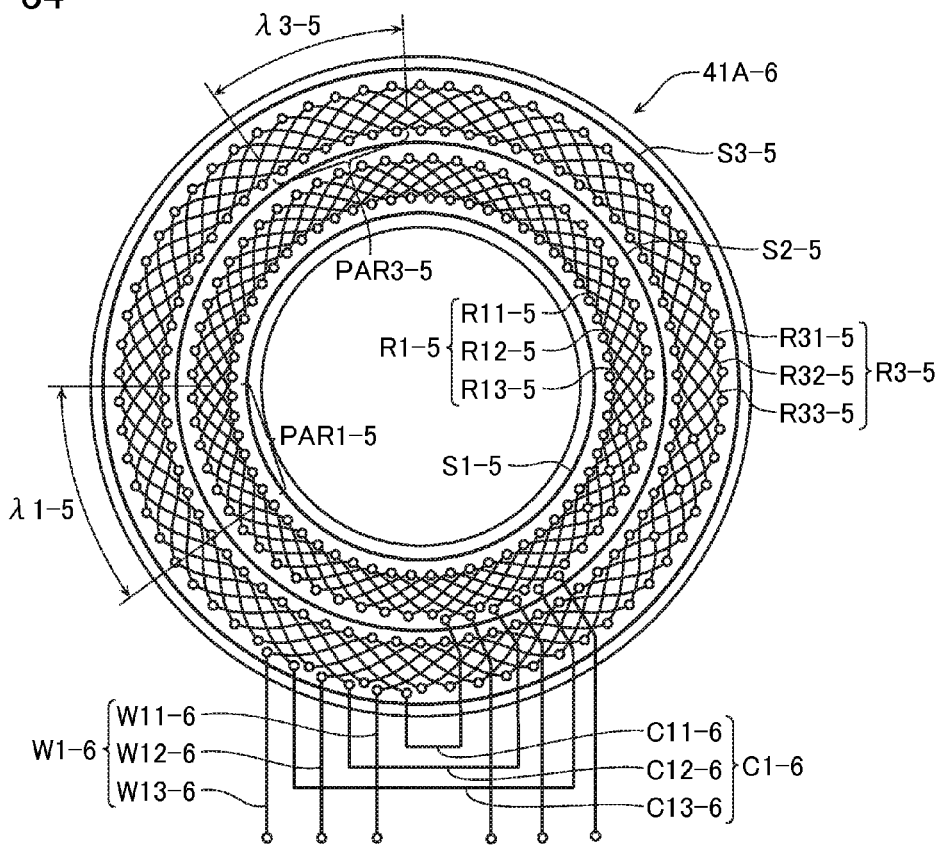
FIG. 34 is a plan view showing a configuration of a first wiring layer 41A-6 configuring the stator 41-6 according to same embodiment.
Figure 35:
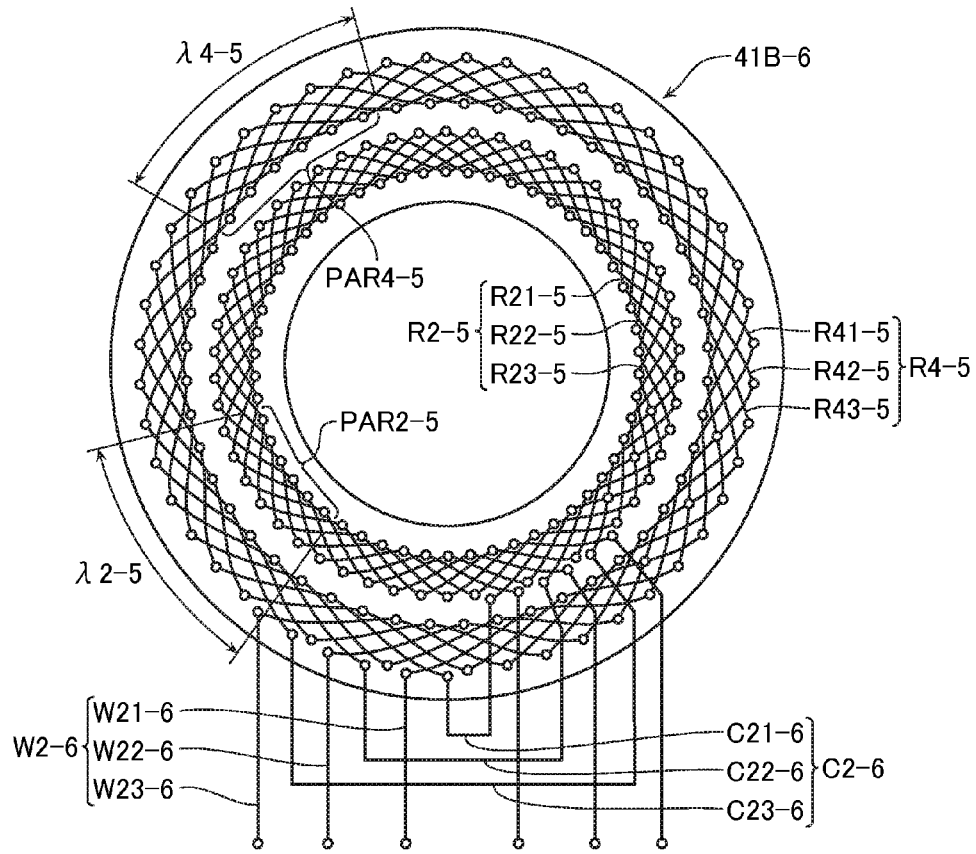
FIG. 35 is a plan view showing a configuration of a second wiring layer 41B-6 configuring the stator 41-6 according to same embodiment.
Figure 36:
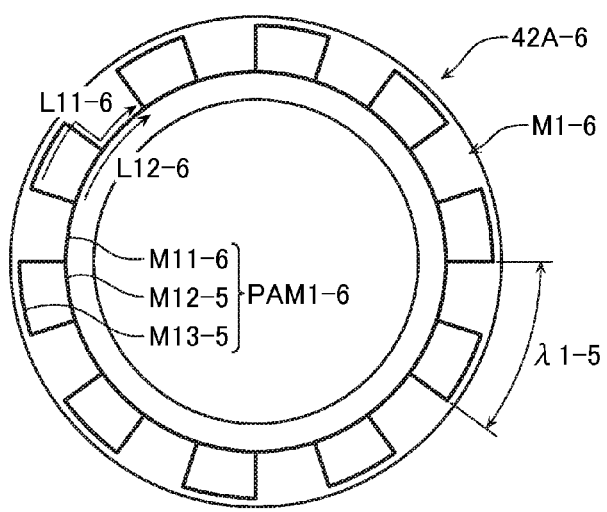
FIG. 36 is a plan view showing a configuration on a first wiring layer 42A-6 configuring the first rotor 42-6 of same embodiment.
Figure 37:
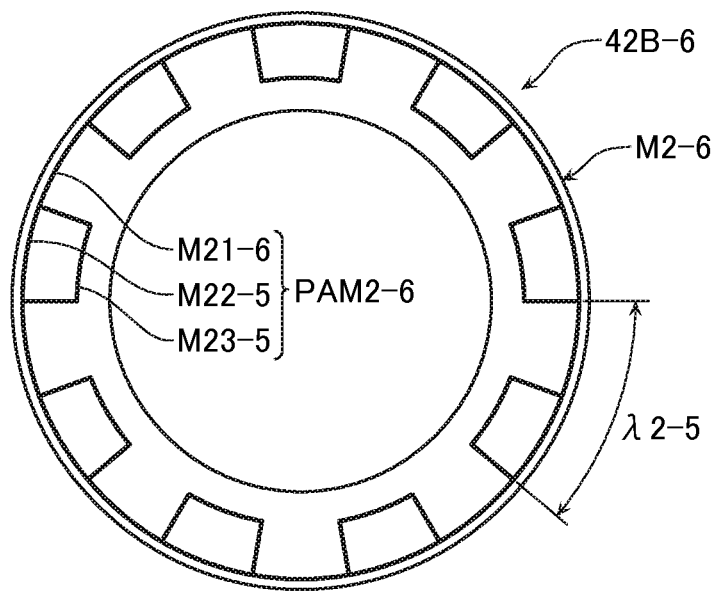
FIG. 37 is a plan view showing a configuration on a second wiring layer 42B-6 configuring the first rotor 42-6 of same embodiment.

Next, a sixth embodiment of the present invention will be described with reference to FIGS. 33 to 37. FIG. 33 is a cross-sectional side view showing a configuration of a stator 41-6 and first and second rotors 42-6 and 51-5 according to the present embodiment. In addition, FIGS. 34 and 35 are plane views showing configurations of a first wiring layer 41A-6 and a second wiring layer 41B-6 of the stator 41-6 according to the present embodiment. Furthermore, FIGS. 36 and 37 are plan views respectively showing configurations on first and second wiring layers 42A-6 and 42B-6 configuring the first rotor 42-6.

As shown in FIGS. 33 to 35, an inductive detection type rotary encoder 4-6 according to the present invention is basically similar to the micrometer head 4-5 according to the third embodiment, but in the present embodiment, in the stator 41-6, two reception windings formed in the first wiring layer 41A-6 are connected in series by a first contact wiring C1-6 and commonly led out by a first lead-out wiring W1-6. Similarly, two reception windings formed in the second wiring layer 41B-6 are connected in series by a second contact wiring C2-6 and commonly led out by a second lead-out wiring W2-6. In such a configuration, it is possible to omit a process for providing a via wiring, and so on, in an insulating layer formed between the first wiring layer 41A-6 and the second wiring layer 41B-6, thereby enabling simplification of a manufacturing process and reduction of manufacturing cost.

Next, operation of the inductive detection type rotary encoder 4-6 in the case of adopting the above-described configuration will be described. When a current is passed through a second transmission winding S2-5, a current is induced in that of the magnetic flux coupling body provided to the first rotor 42-6 that have a shape having overlapped therein shapes of a gear-shaped wiring portion and a circular shaped wiring portion inscribing this gear-shaped wiring portion (the second magnetic flux coupling body M2-5 in the fifth embodiment), and simultaneously a current is induced also in that of the magnetic flux coupling body provided to the second rotor 51-5 that have a shape having overlapped therein shapes of a gear-shaped wiring portion and a circular shaped wiring portion circumscribing this gear-shaped wiring portion (the fourth magnetic flux coupling body M4-5 in the fifth embodiment). In the fifth embodiment, the second reception winding R2-5 and the fourth reception winding R4-5 are provided independently and receive these currents optimally.

In view of the above-described point, it is conceivable also in the present embodiment to configure such that a current induced by the second transmission winding S2-5 flows in different reception windings. Various methods for this are applicable, but in the present embodiment, as shown in FIGS. 36 and 37, a first magnetic flux coupling body M1-6 is formed in a shape having overlapped therein shapes of a gear-shaped wiring portion and a circular shaped wiring portion inscribing this gear-shaped wiring portion, and a second magnetic flux coupling body M2-6 is formed in a shape having overlapped therein shapes of a gear-shaped wiring portion and a circular shaped wiring portion circumscribing this gear-shaped wiring portion. Note that pitches, and so on, of wiring patterns are similar to those in the fifth embodiment, that is, a magnetic pattern of the pitch $\lambda 1$-5 is formed in the first magnetic flux coupling body M1-6 and a magnetic pattern of the pitch $\lambda 2$-5 is formed in the second magnetic flux coupling body M2-6. As a result, the current induced by the second transmission winding S2-5 flows in the first reception winding R1-5 and the fourth reception winding R4-5 that are formed electrically independently (discontinuous), and detection of an angle by the first angle detection track and the fourth angle detection track can be performed optimally. Note that in the present embodiment, contrary to in the fifth embodiment, detection of an angle by the second angle detection track is performed by a first transmission winding S1-5.

Note that it is also possible for the first and second magnetic flux coupling bodies to be configured similarly to in the fifth embodiment, the third magnetic flux coupling body to be configured in a shape having overlapped therein shapes of a gear-shaped wiring portion and a circular shaped wiring portion circumscribing this gear-shaped wiring portion, and the fourth magnetic flux coupling body to be configured in a shape having overlapped therein shapes of a gear-shaped wiring portion and a circular shaped wiring portion inscribing this gear-shaped wiring portion.

[7. Seventh Embodiment]

[7-1. Configuration]

Figure 38:
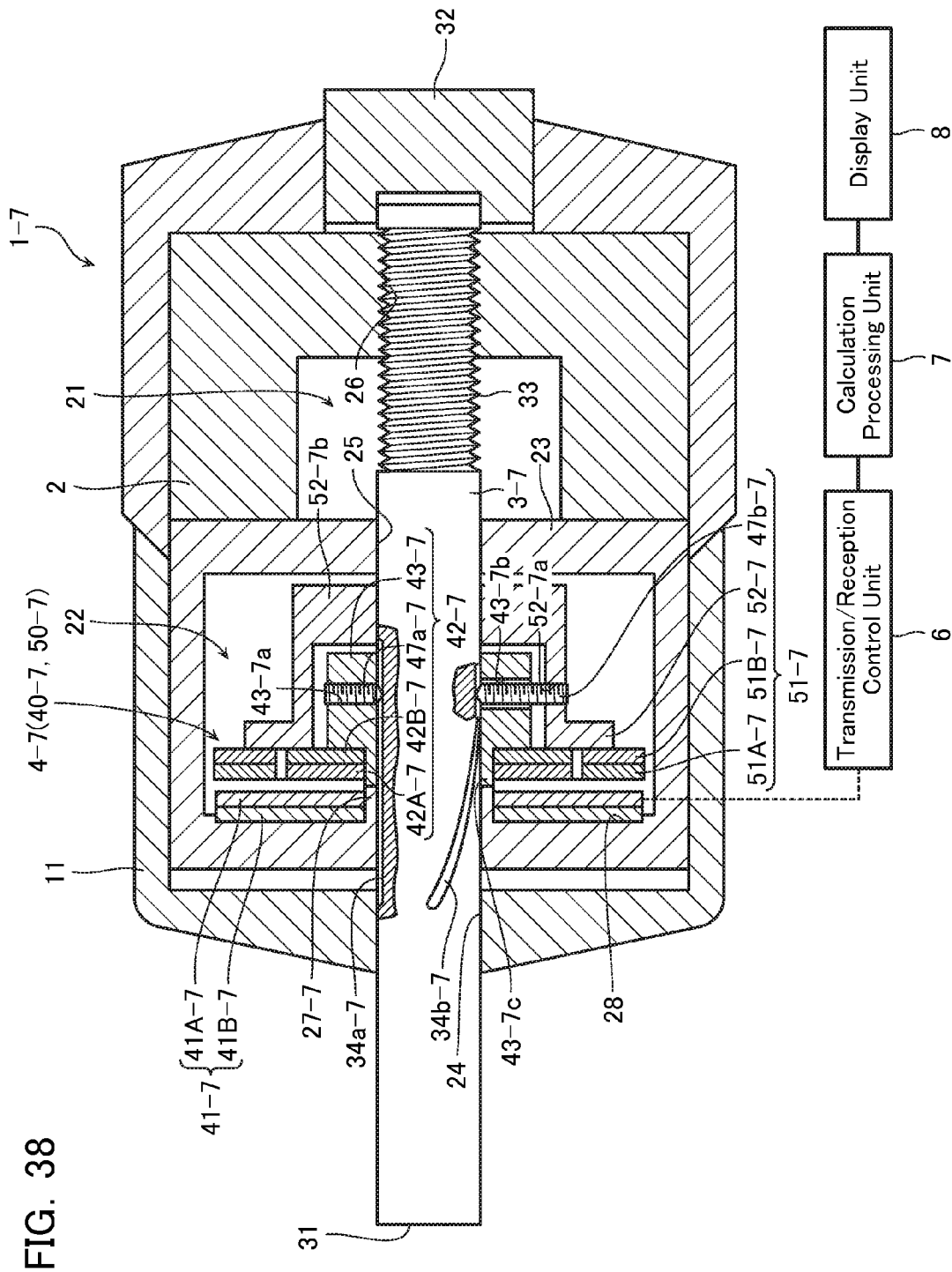
FIG. 38 is a cross-sectional view showing a micrometer head 1-7 according to a seventh embodiment.

Next, an overall configuration of a micrometer head 1-7 having mounted therein an inductive detection type rotary encoder 4-7 according to a seventh embodiment will be described with reference to FIG. 38. FIG. 38 is a cross-sectional view showing the micrometer head 1-7 according to the seventh embodiment. Note that in the seventh embodiment, configurations similar to those of the first embodiment are assigned with identical symbols to those assigned in the first embodiment and a description thereof is omitted.

As shown in FIG. 38, the micrometer head 1-7 includes a spindle 3-7 and the inductive detection type rotary encoder 4-7 provided around the spindle 3-7 that differ from those of the first embodiment. Note that otherwise the micrometer head 1-7 has a similar configuration to in the first embodiment.

The spindle 3-7 is formed in a substantially columnar shape, and includes the contact surface 31 with an object to be measured (not illustrated) at an end on a tip end side, and the knob part 32 at an end on a base end side, similarly to in the first embodiment.

Contrary to in the first embodiment, two key grooves 34a-7 and 34b-7 having different lead angles are provided at a central part of the spindle 3-7. A first key groove 34a-7 is provided linearly parallel to an axis of the spindle 3-7. A second key groove 34b-7 is provided helically with respect to the spindle 3-7. Positions of a starting point and a finishing point of the first key groove 34a-7 and the second key groove 34b-7 are substantially matched in an axial direction of the spindle 3-7. That is, the first key groove 34a-7 and the second key groove 34b-7 are formed in substantially the same range in the axial direction of the spindle 3-7.

Note that when the spindle 3-7 advances/retracts, the key grooves 34a-7 and 34b-7 protrude to outside of the main body 2 along with the spindle 3-7. However, an outside frame 11 is provided to prevent the key grooves 34a-7 and 34b-7 from being exposed to the outside, even when the spindle 3-7 is advanced forward to a maximum extent.

Figure 39:
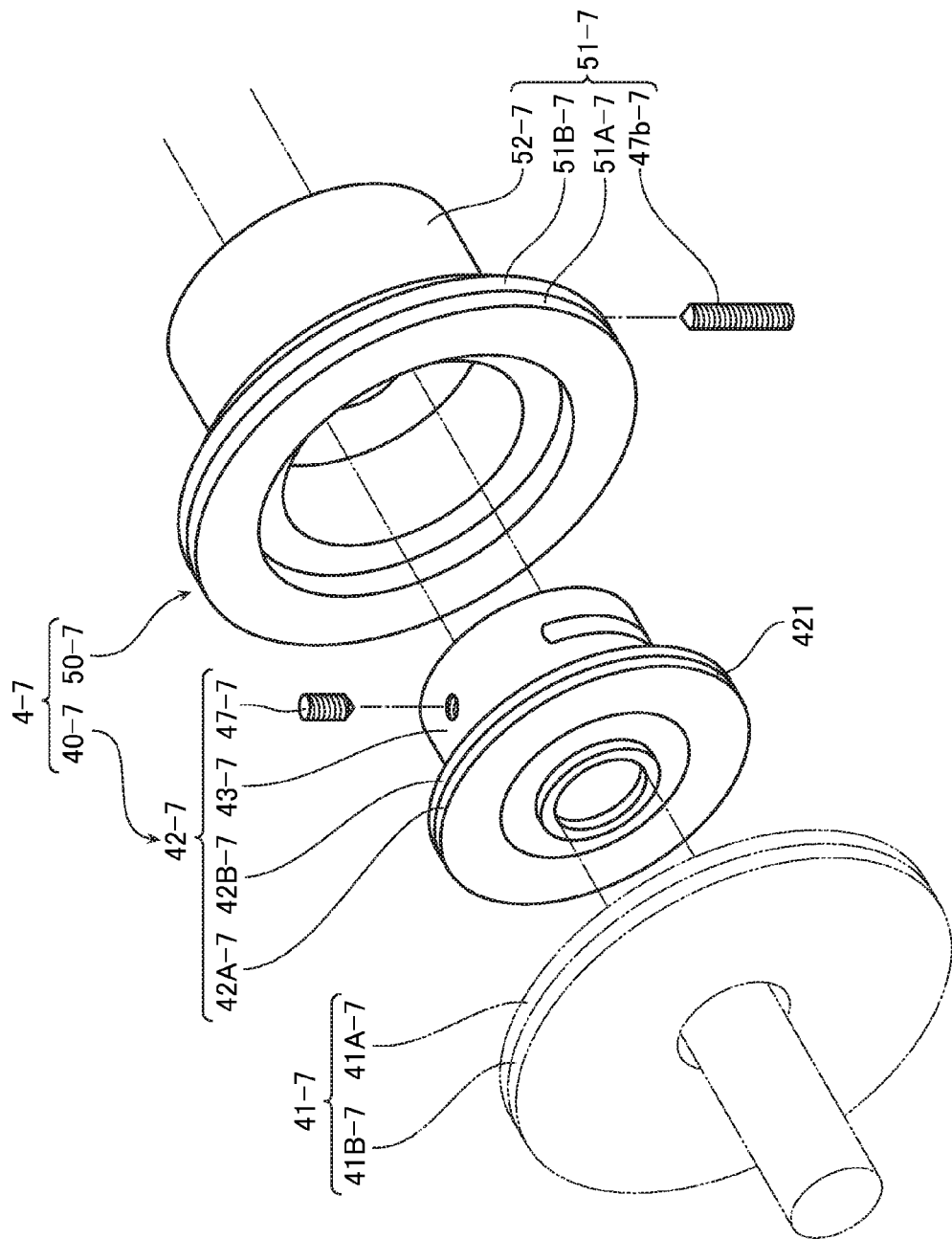
FIG. 39 is an exploded perspective view of an inductive detection type rotary encoder 4-7 of same embodiment.

Next, the inductive detection type rotary encoder 4-7 will be described. FIG. 39 is an exploded perspective view of the inductive detection type rotary encoder 4-7.

As shown in FIG. 39, the inductive detection type rotary encoder 4-7 is configured from a first rotary encoder 40-7 and a second rotary encoder 50-7, and is disposed within the housing space 22 of the main body 2.

The first rotary encoder 40-7 includes a stator 41-7 and a first rotor 42-7 which is provided rotatably around the spindle 3-7 and includes a key 47a-7 that engages with the key groove 34-7.

The stator 41-7 is fixed to a front end side inner wall 28 of the housing space 22 in a state of having the spindle 3-7 inserted therethrough.

The first rotor 42-7 is disposed on an immediately outer side of the spindle 3-7. The first rotor 42-7 is disposed facing the stator 41-7 in the axial direction at a position separated from the stator 41-7 by a certain distance. The first rotor 42-7 comprises: a first wiring layer 42A-7 and a second wiring layer 42B-7 that configure a pair with the stator 41-7 and are rotated with respect to the stator 41-7 in a state of facing the stator 41-7; a first rotation cylinder 43-7 that rotatably supports the first and second wiring layers 42A-7 and 42B-7 around the spindle 3-7; and a first key 47a-7 that engages with the first key groove 34a-7. In the present embodiment, the first wiring layer 42A-7 and the second wiring layer 42B-7 are small circular plates each including a hole through which the spindle 3-7 is inserted.

The first rotation cylinder 43-7 has a cylindrical shape externally fitted to the spindle 3-7, is connected to a back surface of a first rotor 42-7, and rotatably supports the first rotor 42-7. The first rotation cylinder 43-7 is provided with two holes 43-7a and 43-7b formed penetrating in a direction orthogonal to the axis thereof, and a first hole 43-7a has the first key 47a-7 threaded therein. Moreover, a second hole 43-7b is formed in an elongated hole shape having a length in a circumferential direction of the first rotation cylinder 43-7.

The second rotary encoder 50-7 includes the stator 41-7 and a second rotor 51-7 which is provided rotatably around the spindle 3-7 and includes a key 47b-7 that engages with the key groove 34b-7.

The second rotor 51-7 is disposed on an outer side of the first rotor 42-7 to surround the first rotor 42-7. The second rotor 51-7 is disposed facing the stator 41-7 in the axial direction at a position separated from the stator 41-7 by a certain distance. Similarly to the first rotor 42-7, the second rotor 51-7 comprises: a first wiring layer 51A-7 and a second wiring layer 51B-7 that configure a pair with the stator 41-7 and are rotated with respect to the stator 41-7 in a state of facing the stator 41-7; a second rotation cylinder 52-7 that rotatably supports the first and second wiring layers 51A-7 and 51B-7 around the spindle 3-7; and a second key 47b-7 that engages with the second key groove 34b-7.

The first wiring layer 51A-7 and the second wiring layer 51B-7 are circular plates each including an inner hole of a degree of a size such that the first wiring layer 42A-7 and the second wiring layer 42B-7 included in the first rotor 42-7 loosely fit on an inner side thereof. The second rotation cylinder 52-7 is connected to a back surface of the second wiring layer 51B-7, and is of a cylindrical shape including a hole into an inner side of which the first rotation cylinder 43-7 loosely fits.

The second rotation cylinder 52-7 includes a hole 52-7a formed penetrating from a direction orthogonal to the axis thereof, and this hole 52-7a has the second key 47b-7 threaded therein. Note that the second key 47b-7 passes through the second hole 43-7b which is the elongated hole of the first rotation cylinder 43-7 to be engaged with the second key groove 34b-7.

Moreover, the second rotation cylinder 52-7 includes a bearing portion 52-7b that bears the spindle 3-7 on an opposite side to the stator 41-7, sandwiching the first rotor 42-7. Moreover, a position of the second key 47b-7 is substantially the same as a position of the first key 47a-7 provided to the first rotation cylinder 43-7, in the spindle axis direction.

Note that in the front end side inner wall 28 of the housing space 22 to which the stator 41-7 is fixed, a spindle bearing 27-7 is provided extended slightly more to a back end side than the stator 41-7, moreover, a spindle bearing 43-7c of the first rotation cylinder 43-7 is provided extended slightly more to a stator 41-7 side than the first wiring layer 51A-7 and second wiring layer 51B-7, and the spindle bearing 43-7c of the first rotation cylinder 43-7 contacts the spindle bearing 27-7 of the main body 2. As a result, a gap between the stator 41-7 and the first wiring layer 51A-7 is appropriately secured.

In addition, a coil spring (biasing means) not illustrated is provided and fitted between the second rotation cylinder 52-7 and the partitioning plate 23 whereby the second rotor 51-7 is biased toward a stator 41-7 side, and the first rotor 42-7 is also biased toward the stator 41-7 by being pressed by an inner wall of the second rotation cylinder 52-7.

[7-2. Operation of Micrometer Head 1-7]

Next, operation of the micrometer head 1-7 according to the fifth embodiment comprising such a configuration will be described. When the spindle 3-7 is rotated by the knob part 32, the female screw 26 of the main body 2 is engaged with the feed screw 33 of the spindle 3-7 whereby the spindle 3-7 is advanced or retracted in an axial direction.

Moreover, when the spindle 3-7 is rotated, the first key 47a-7 of the first rotation cylinder 43-7 and the second key 47b-7 of the second rotation cylinder 52-7 are respectively engaged with the first key groove 34a-7 and the second key groove 34b-7 of the spindle 3-7, hence the first rotation cylinder 43-7 and the second rotation cylinder 52-7 are rotated along with rotation of the spindle 3-7. At this time, the first rotation cylinder 43-7 is bearing the spindle 3-7 by the spindle bearing 43-7c, hence the first rotation cylinder 43-7 rotates with reference to the spindle 3-7. Moreover, the second rotation cylinder 52-7 is bearing the spindle 3-7 by a bearing portion 52-7b, hence the second rotation cylinder 52-7 also rotates with reference to the spindle 3-7.

Moreover, since the first key groove 34a-7 and the second key groove 34b-7 have lead angles that differ from each other, the first rotation cylinder 43-7 and the second rotation cylinder 52-7 are rotated by mutually differing rotation amounts (rotation phases) when the spindle 3-7 makes one revolution. When the first and second rotation cylinders 43-7 and 52-7 are rotated by rotation of the spindle 3-7, the first rotor 42-7 is rotated along with the first rotation cylinder 43-7 and the second rotor 51-7 is rotated along with the second rotation cylinder 52-7. That is, in the seventh embodiment too, similarly to in the first embodiment, the first rotor 42-7 rotates with a different rotation speed from that of the second rotor 51-7.

Note that in the seventh embodiment too, similarly to in the first embodiment, the first and second magnetic flux coupling bodies M1 and M2 are formed on the first rotor 42-7 facing the stator 41. The third and fourth magnetic flux coupling bodies M3 and M4 are formed on the second rotor 51-7 facing the stator 41. The first through third transmission windings S1 to S3 and the first through third reception windings R1 to R3 are formed on the stator 41-7 facing the first and second rotors 42-7 and 51-7.

[7-3. Advantages]

The micrometer head 1-7 according to the seventh embodiment is configured substantially similarly to that of the first embodiment, hence displays similar advantages to those of the first embodiment.

[8. Eighth Embodiment]

Next, an eighth embodiment of the present invention will be described. The above-described inductive detection type rotary encoders according to the first through seventh embodiments were configured including two each of rotors rotating with different speeds. However, the present invention may of course be adopted also in the case where there is one rotor and in such cases as where there are three or more rotors. The present embodiment describes the case where there is only one rotor.

Figure 40:
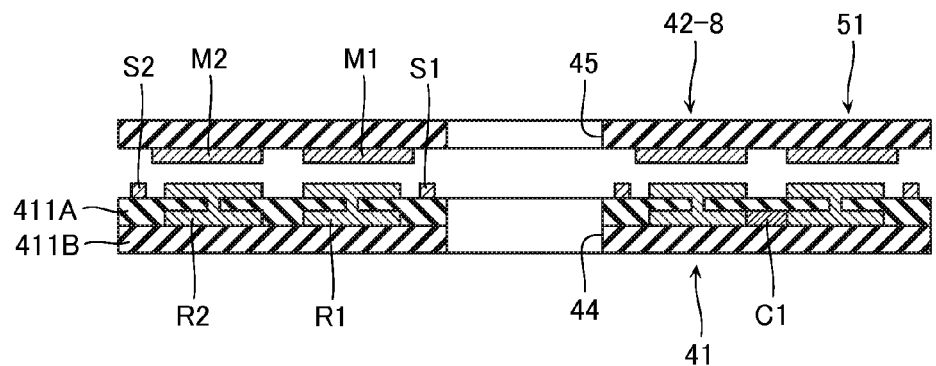
FIG. 40 is a cross-sectional side view showing a configuration of a stator 41 and a rotor 42-8 of an inductive detection type rotary encoder according to an eighth embodiment.

FIG. 40 is a cross-sectional side view showing a configuration of a rotor 42-8 and a stator 41 configuring an inductive detection type rotary encoder according to the present embodiment. The inductive detection type rotary encoder according to the present embodiment has a substantially similar configuration to that of the inductive detection type rotary encoder according to the first embodiment, but differs in that whereas the inductive detection type rotary encoder according to the first embodiment comprises the first rotor 42 and the second rotor 51, the inductive detection type rotary encoder according to the present embodiment comprises only one rotor, that is the rotor 42-8. Note that a configuration of the stator 41 is similar to the configuration of the stator 41 according to the first embodiment.

Figure 41:
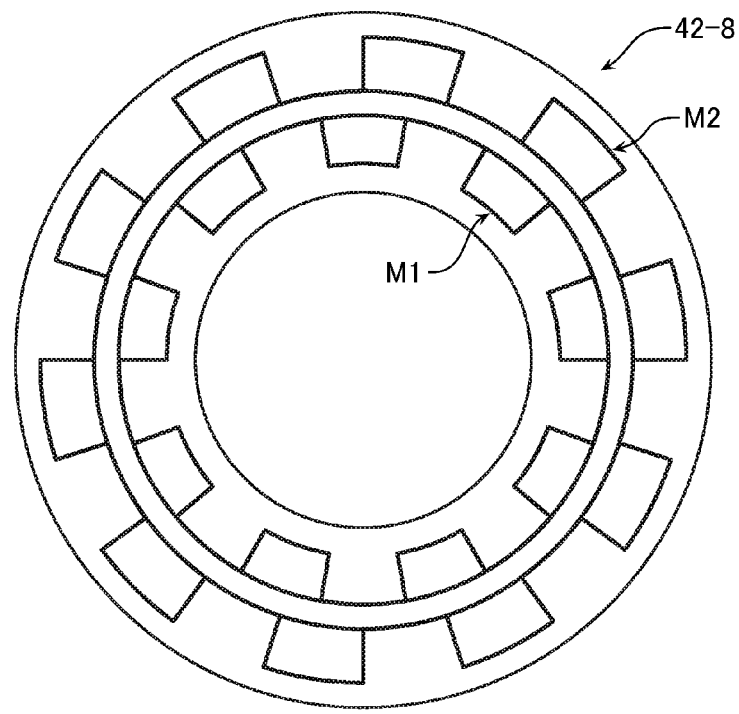
FIG. 41 is a plan view showing the configuration of the rotor 42-8 of same inductive detection type rotary encoder.

FIG. 41 is a plane view showing the configuration of the rotor 42-8 configuring the inductive detection type rotary encoder according to the present embodiment. Disposed on this rotor 42-8 are a first magnetic flux coupling body M1 and a second magnetic flux coupling body M2 configured similarly to the first magnetic flux coupling body M1 and the second magnetic flux coupling body M2 of the inductive detection type rotary encoder according to the first embodiment.

Since the inductive detection type rotary encoder according to the present embodiment comprises only the one rotor 42-8, a position of the spindle 3 is calculated from a rotation angle between this rotor 42-8 and the stator 41. Therefore, a rotation mechanism of gears or the like is not required, thereby making it possible to adopt a simpler configuration compared to the first through seventh embodiments. Since such a rotary encoder also comprises the stator 41 configured similarly to in the first embodiment, the number of lead-out wirings can be reduced thereby enabling similar benefits to those of the first embodiment to be gained.

[9. Other Embodiments]

This concludes description of embodiments of the inductive detection type rotary encoder according to the present invention, but it should be noted that the present invention is not limited to the above-described embodiments, and that various alterations, additions, substitutions, and so on, are possible within a range not departing from the scope and spirit of the invention. For example, the first through fourth magnetic flux coupling bodies may be an electrode, a hole formed in a conductive plate, a concave portion, or the like, rather than the first through fourth magnetic flux coupling windings as in the above-described embodiments.

In addition, the above-described embodiments detect what number of revolutions the first rotor has made based on a positional relationship of the first rotor and the second rotor. However, the present invention may detect what number of revolutions the second rotor has made based on the positional relationship of the first rotor and the second rotor.

What is claimed is:

1. An inductive detection type rotary encoder, comprising:
   a stator;
   a rotor that is engaged with a rotation shaft to rotate along with the rotation shaft and faces the stator in an axial direction in which the rotation shaft extends; and
   at least two angle detection tracks that are formed coaxially to the rotation shaft on a surface of the stator facing the rotor and a surface of the rotor facing the stator and are disposed from an inner peripheral side to an outer peripheral side,
   the at least two angle detection tracks each comprising:
   a transmission winding that is provided to the stator and is formed annularly around the rotation shaft;
   a reception winding that is provided to the stator and is formed annularly around the rotation shaft along the transmission winding; and
   a magnetic flux coupling body that is provided to the rotor and is formed annularly around the rotation shaft to be magnetic flux coupled with the transmission winding and the reception winding,
   one of the angle detection tracks comprising a first reception winding,
   another of the angle detection tracks comprising a second reception winding,
   the first reception winding and the second reception winding being commonly connected, and
   the first reception winding and the second reception winding being each led out by lead-out wirings.

2. The inductive detection type rotary encoder according to claim 1, wherein
   the rotor comprises
   a first rotor that is engaged with the rotation shaft to rotate along with the rotation shaft and faces the stator in the axial direction, and
   a second rotor that is disposed on an outer peripheral side of the first rotor, is rotatable with respect to the first rotor, and faces the stator in the axial direction,
   the inductive detection type rotary encoder further comprises a rotation transmitting means that transmits rotation of the rotation shaft to rotate the second rotor at a different rotation speed from the first rotor,
   the at least two angle detection tracks comprise an inner peripheral side angle detection track and an outer peripheral side angle detection track that is disposed on an outer peripheral side of the inner peripheral side angle detection track,
   the inner peripheral side angle detection track is formed coaxially to the rotation shaft on a surface of the stator facing the first rotor and a surface of the first rotor facing the stator,
   the outer peripheral side angle detection track is formed coaxially to the rotation shaft on a surface of the stator facing the second rotor and a surface of the second rotor facing the stator,
   a magnetic flux coupling body configuring the inner peripheral side angle detection track is provided to the first rotor, and
   a magnetic flux coupling body configuring the outer peripheral side angle detection track is provided to the second rotor.

3. The inductive detection type rotary encoder according to claim 1, wherein
   the rotor comprises
   a first rotor that is engaged with the rotation shaft to rotate along with the rotation shaft and faces the stator in the axial direction, and
   a second rotor that is disposed on an outer peripheral side of the first rotor, is rotatable with respect to the first rotor, and faces the stator in the axial direction,
   the inductive detection type rotary encoder further comprises a rotation transmitting means that transmits rotation of the rotation shaft to rotate the second rotor at a different rotation speed from the first rotor,
   the at least two angle detection tracks comprise
   a first angle detection track and a second angle detection track that are formed coaxially to the rotation shaft at, respectively, a portion of the stator facing the first rotor and a portion of the first rotor facing the stator, and
   a third angle detection track and a fourth angle detection track that are formed coaxially to the rotation shaft at, respectively, a portion of the stator facing the second rotor and a portion of the second rotor facing the stator, and
   one of the first through fourth angle detection tracks comprises the first reception winding,
   another of the first through fourth angle detection tracks comprises the second reception winding the first reception winding and the second reception winding are commonly connected, and the first reception winding and the second reception winding are each led out by lead-out wirings.

4. The inductive detection type rotary encoder according to claim 3, wherein the first and second angle detection tracks are formed on a surface of the stator facing the first rotor and a surface of the first rotor facing the stator, the second angle detection track is disposed on an outer peripheral side of the first angle detection track, the third and fourth angle detection tracks are formed on a surface of the stator facing the second rotor and a surface of the second rotor facing the stator, and the fourth angle detection track is disposed on an outer peripheral side of the third angle detection track.

5. The inductive detection type rotary encoder according to claim 3, wherein the first and second angle detection tracks are formed stacked in a direction that the stator and the rotor face each other, and the third and fourth angle detection tracks are formed stacked in the direction that the stator and the rotor face each other.

6. The inductive detection type rotary encoder according to claim 3, wherein the first angle detection track generates N1 periodical changes of signal for one revolution of the first rotor, the second angle detection track generates N2 periodical changes of signal for one revolution of the first rotor, the third angle detection track generates N3 periodical changes of signal for one revolution of the second rotor, the fourth angle detection track generates N4 periodical changes of signal for one revolution of the second rotor, N1, N2, N3, and N4 are different numbers from each other, and greatest common factors of one and another of N1, N2, N3, and N4 are all 1.

7. The inductive detection type rotary encoder according to claim 3, wherein the others of the first through fourth angle detection tracks respectively comprise a third reception winding and a fourth reception winding, the third reception winding and the fourth reception winding are commonly connected, and the first reception winding and the third reception winding are induced with a current simultaneously by a common transmission winding.

8. The inductive detection type rotary encoder according to claim 1, further comprising a contact wiring, wherein the first reception winding and the second reception winding are connected by the contact wiring.

9. The inductive detection type rotary encoder according to claim 1, further comprising a contact wiring, wherein the first reception winding and the second reception winding are connected in series by the contact wiring and led out by a common lead-out wiring.

* * * * *